US010349104B2

(12) United States Patent
Phillips et al.

(10) Patent No.: US 10,349,104 B2
(45) Date of Patent: Jul. 9, 2019

(54) SYSTEM AND METHOD FOR MANAGING SEGMENT DELIVERY AND BANDWIDTH RESPONSIVE TO ENCODING COMPLEXITY METRICS

(71) Applicant: Ericsson AB, Stockholm (SE)

(72) Inventors: Chris Phillips, Hartwell, GA (US); Rickard Sjöberg, Stockholm (SE); Robert Hammond Forsman, Sugar Hill, GA (US); Ian Tapp, Alpharetta, GA (US)

(73) Assignee: ERICSSON AB, Stockholm (SE)

( * ) Notice: Subject to any disclaimer, the term of this patent is extended or adjusted under 35 U.S.C. 154(b) by 0 days.

(21) Appl. No.: 14/830,109

(22) Filed: Aug. 19, 2015

(65) Prior Publication Data
US 2017/0055012 A1 Feb. 23, 2017

(51) Int. Cl.
| | |
|---|---|
| H04L 29/06 | (2006.01) |
| H04L 29/08 | (2006.01) |
| H04N 21/24 | (2011.01) |
| H04N 21/234 | (2011.01) |
| H04N 21/254 | (2011.01) |
| H04N 21/258 | (2011.01) |
| H04N 21/647 | (2011.01) |
| H04N 21/845 | (2011.01) |
| H04N 21/2343 | (2011.01) |
| H04N 21/2383 | (2011.01) |
| H04N 21/2385 | (2011.01) |
| H04N 21/2662 | (2011.01) |

(52) U.S. Cl.
CPC ..... *H04N 21/2662* (2013.01); *H04L 65/4084* (2013.01); *H04L 65/607* (2013.01); *H04L 67/02* (2013.01); *H04L 67/06* (2013.01); *H04L 67/42* (2013.01); *H04N 21/2383* (2013.01); *H04N 21/2385* (2013.01); *H04N 21/23439* (2013.01); *H04N 21/234309* (2013.01); *H04N 21/2402* (2013.01); *H04N 21/8456* (2013.01); *H04N 21/23418* (2013.01); *H04N 21/2401* (2013.01); *H04N 21/254* (2013.01); *H04N 21/25833* (2013.01); *H04N 21/64738* (2013.01)

(58) Field of Classification Search
CPC ......... H04N 21/23805; H04N 21/2385; H04N 21/24; H04N 21/2402; H04N 21/26208; H04N 21/26216; H04N 21/6373
See application file for complete search history.

(56) References Cited

U.S. PATENT DOCUMENTS

| | | |
|---|---|---|
| 2002/0002564 A1 | 1/2002 | Munestsugu et al. |
| 2002/0199060 A1 | 12/2002 | Peters et al. |
| 2006/0224762 A1 | 10/2006 | Tian et al. |
| 2011/0305273 A1* | 12/2011 | He ........................... H04N 7/26 |
| 2013/0128950 A1 | 5/2013 | Srinivasamurthy et al. |

(Continued)

*Primary Examiner* — Benjamin R Bruckart
*Assistant Examiner* — Anthony Bantamoi

(57) ABSTRACT

A complexity-driven adaptive quality scheme for managing segment delivery and bandwidth allocation in an ABR network. Segments for downloading to a requesting ABR client may be selected based on encoding complexity data associated therewith, wherein a virtual segmenter may operate to represent the media segments in a memory using associated pointers. In a bandwidth management configuration using a WFQ scheduling mechanism, delivery weights may be modified based on the complexity data.

26 Claims, 25 Drawing Sheets

(56) References Cited

U.S. PATENT DOCUMENTS

| | | |
|---|---|---|
| 2013/0163430 A1 | 6/2013 | Gell et al. |
| 2013/0179588 A1* | 7/2013 | McCarthy ........ H04N 21/23418 709/231 |
| 2013/0227625 A1 | 8/2013 | Forsman et al. |
| 2014/0013376 A1 | 1/2014 | Xu et al. |
| 2014/0143823 A1* | 5/2014 | Manchester ........ H04L 65/4084 725/116 |
| 2014/0258345 A1* | 9/2014 | McPhillen ............ G06F 1/3007 707/821 |
| 2014/0351385 A1 | 11/2014 | Li et al. |
| 2015/0089072 A1 | 3/2015 | Phillips et al. |
| 2015/0163540 A1 | 6/2015 | Masterson |
| 2015/0172680 A1* | 6/2015 | Zhou .................... H04N 19/196 |
| 2016/0021380 A1 | 1/2016 | Li et al. |
| 2016/0028651 A1 | 1/2016 | Ramakrishnan et al. |
| 2016/0050246 A1* | 2/2016 | Liao .................... H04L 65/4092 709/219 |
| 2016/0295216 A1* | 10/2016 | Aaron .................. H04N 19/146 |

* cited by examiner

Example HLS Manifest

```
#EXTM3U
#EXT-X-STREAM-INF:PROGRAM-
ID=1,BANDWIDTH=13000000,RESOLUTION=1920x1080,
    CODECS="avc1.42e00a,mp4a.40.2"
http://example.com/HD1/index.m3u8
    \
#EXT-X-STREAM-INF:PROGRAM-
ID=1,BANDWIDTH=10000000,RESOLUTION=1920x1080,
    CODECS="avc1.42e00a,mp4a.40.2"
http://example.com/SD1/index.m3u8
    \
#EXT-X-STREAM-INF:PROGRAM-
ID=1,BANDWIDTH=1800000,RESOLUTION=1920x1080,
    CODECS="avc1.42e00a,mp4a.40.2"
http://example.com/SD2/index.m3u8
#EXT-X-STREAM-INF:PROGRAM-
ID=1,BANDWIDTH=1400000,RESOLUTION=640x360,
    CODECS="avc1.42e00a,mp4a.40.2"
http://example.com/high/index.m3u8
    \
    .
    .
    .
#EXT-X-STREAM-INF:PROGRAM-
ID=1,BANDWIDTH=500000,RESOLUTION=328x240, \
    CODECS="avc1.42e00a,mp4a.40.2"
http://example.com/SSD3/index.m3u8
```

— FIG. 5C (top section)
— FIG. 5D (bottom section)

Example HLS Manifest hd1/index.m3u8 referencing 13.0 Mbs ABR
Media Segments

```
#EXTM3U
#EXT-X-PLAYLIST-TYPE:VOD
#EXT-X-TARGETDURATION:10
#EXT-X-VERSION:3
#EXT-X-MEDIA-SEQUENCE:0
#EXTINF:10.0,
http://example.com/HD1/fileSequenceA.ts
#EXTINF:10.0,
http://example.com/HD1/fileSequenceB.ts
#EXTINF:10.0,
http://example.com/HD1/fileSequenceC.ts
#EXTINF:9.0,
http://example.com/HD1/fileSequenceD.ts
              .
              .
              .
#EXTINF:9.0,
http://example.com/HD1/fileSequenceN.ts

#EXT-X-ENDLIST
```

Example HLS Manifest SubSDn/index.m3u8 referencing 500 Kbs ABR
Media Segments

```
#EXTM3U
#EXT-X-PLAYLIST-TYPE:VOD
#EXT-X-TARGETDURATION:10
#EXT-X-VERSION:3
#EXT-X-MEDIA-SEQUENCE:0
#EXTINF:10.0,
http://example.com/SubSDn/fileSequenceA.ts
#EXTINF:10.0,
http://example.com/SubSDn/fileSequenceB.ts
#EXTINF:10.0,
http://example.com/SubSDn/fileSequenceC.ts
#EXTINF:9.0,
http://example.com/SubSDn/fileSequenceD.ts
    .
    .
    .
#EXTINF:9.0,
http://example.com/SubSDn/fileSequenceN.ts

#EXT-X-ENDLIST
```

Segmenter Generated Complexity Catalog For Each Segment Across All
Bitrates/Resolutions in The Segment List

```
<Segment>
        <?xml version="1.0"?>
<segmentlist>
</segment>
  <segment id=1>
    <URLlist>
      <URL>http://example.com/HD1/fileSequenceA.ts</URL>
        .
        .
        .
      <URL>http://example.com/SubSDn/fileSequenceA.ts</URL>
    <</URLlist>
    <AverageComplexity>4.2</AverageComplexity>
    <Duration>10</Duration>
  </segment>
    <segment id=2>
    <URLlist>
      <URL>http://example.com/HD1/fileSequenceB.ts</URL>
        .
        .
        .
      <URL>http://example.com/SubSDn/fileSequenceB.ts</URL>
    <</URLlist>
    <AverageComplexity>5.9</AverageComplexity>
    <Duration>10</Duration>
  </segment>
</segment>
    <segment id=3>
    <URLlist>
      <URL>http://example.com/HD1/fileSequenceC.ts</URL>
        .
        .
        .
      <URL>http://example.com/SubSDn/fileSequenceC.ts</URL>
    <</URLlist>
    <AverageComplexity>6.2</AverageComplexity>
    <Duration>10</Duration>
  </segment>
</segment>
    <segment id=4>
    <URLlist>
      <URL>http://example.com/HD1/fileSequenceD.ts</URL>
```

SYSTEM AND METHOD FOR MANAGING SEGMENT DELIVERY AND BANDWIDTH RESPONSIVE TO ENCODING COMPLEXITY METRICS

FIELD OF THE DISCLOSURE

The present disclosure generally relates to communication networks. More particularly, and not by way of any limitation, the present disclosure is directed to a system and method for managing segment delivery and/or bandwidth in an adaptive bitrate (ABR) streaming environment responsive to encoding complexity.

BACKGROUND

Traditional ABR video delivery systems rely on encodings of video assets across multiple bitrates and resolutions, which may be transported over Internet Protocol (IP) networks using Hypertext Transfer Protocol (HTTP). ABR content may also be encrypted using Digital Rights Management (DRM) techniques to prevent content theft. Such developments render the content indistinguishable from regular web pages, which are also transported using HTTP. As a result, IP routers along the network path to a consumer may not be able to implement techniques for facilitating high quality delivery based on service differentiation, potentially causing an unsatisfactory service experience for consumers. Furthermore, conventional bandwidth management techniques operating at routers provide a minimal improvement at best, especially in the context of ABR video traffic.

It is also known that ABR can result in unfair and sometimes incongruous apportionment of bandwidth in a network. Since the bandwidth usage is typically determined by a client requesting the content, and because the ABR clients can be opportunistic, they may become greedy. Traditional bandwidth management schemes are deficient in a multi-client environment, however, especially where the negative effects of a greedy client become more pronounced in the presence of a duty cycle of another ABR client. Additionally, different clients behave differently and often unpredictably, which poses further challenges to a network provider that aims to provide a more consistent quality of service across the board in the network.

SUMMARY

The present patent disclosure is broadly directed to various systems, methods, apparatuses, as well as client devices and associated non-transitory computer-readable media for facilitating a complexity-driven adaptive quality scheme in managing segment delivery and bandwidth in an ABR network. It should be appreciated that for purposes one or more embodiments of the present patent application, video complexity or "encoding complexity" may be contemplated in terms of a bitrate required for a piece of content to reach a certain video quality, based on subjective or objective assessments or a combination of both. To put it differently, complexity can be seen as a property of the media which affects its encoding. Further, such complexity information (which may be referred to as encoding complexity metric (ECM) information), or somewhat synonymously, video complexity metric (VCM) information) may be evaluated at various levels, e.g., a block, a segment, scene, a frame, or a portion between two timing references, or an entire content file or program, based on a number of techniques as will be set forth in detail further below. Such ECM information may also be related to quality parametric information in regard to certain implementations. By way of illustration, a larger ECM value would generally indicate a complex scene or media; in other words, a more complex scene is one that at a given bitrate looks worse than a less complex scene with a lower ECM value. Accordingly, a high ECM value is generally indicative of low quality given a certain bitrate (i.e., in an inverse relationship, in some sense).

In one aspect, an embodiment of a complexity-driven method operative at an ABR network node, e.g., operating in association with one or more content sources, is disclosed. The claimed method comprises, inter alia, obtaining encoding complexity metric (ECM) information associated with one or more ABR representations of a media asset wherein the one or more ABR representations each comprise a stream of segmented content of the media asset encoded at a particular bitrate. The claimed embodiment further includes providing the ECM information to a stream delivery server for facilitating at least one of complexity-driven segment delivery and bandwidth management with respect to delivering the media asset to an ABR client device. In another aspect, an apparatus configured to operate as an ABR network node for providing encoded and segmented media content in an ABR network is disclosed. The claimed apparatus comprises, inter alia, at least one processor; and one or more persistent memory modules coupled to the at least one processor, wherein the persistent memory modules include program instructions which, when executed by the at least one processor, are configured to perform the foregoing method. In one embodiment, the ECM information may be provided as a complexity catalog file included within a manifest associated with streaming of the media asset, wherein the ECM information is computed over applicable timing reference points of each ABR representation of the media asset. Example timing reference points may include, but not limited to, stream access points (SAP), presentation timestamps (PTS), decoding timestamps (DTS), program clock references (PCR), system clock references (SCR) and the like associated with each ABR representation.

In another aspect, a method operating at a stream delivery server for managing delivery of segmented media content in an ABR network is disclosed. The claimed method comprises, inter alia, receiving ECM information or values (e.g., MOS data) associated with one or more ABR representations of a media asset wherein the one or more ABR representations each comprise a stream of segmented content of the media asset encoded at a particular bitrate. Responsive to a segment download request from an ABR client device, a determination is made with respect to a set of video encoding bitrates identified within a manifest provided to the ABR client device for facilitating streaming of the media asset, wherein the set of video encoding bitrates consist of bitrates of segments belonging to a same video resolution class that the ABR client device has settled on for streaming the media asset. ECM-based decision-making processes involving segment selection may be engaged based on evaluating received ECM values across segment bitrates of the same video resolution class against a complexity threshold value and selecting a lowest-bitrate-encoded segment having an ECM value equal to or exceeding the complexity threshold value; and delivering the selected segment to the ABR client device. In a related aspect, an apparatus configured to operate as a stream delivery server is disclosed wherein a processor and one or more persistent memory modules associated therewith may execute program instructions for performing an embodiment of the segment delivery method set forth herein.

In a further aspect, a bandwidth management method operating at a stream delivery server is disclosed. The claimed method comprises, inter alia, receiving ECM information associated with one or more ABR representations of a media asset wherein the one or more ABR representations each comprise a stream of segmented content of the media asset encoded at a particular bitrate. Responsive to a segment download request from an ABR client device with respect to streaming the media asset in a streaming session, a determination is made if a summation time comprising a current segment time added to an initial Look Ahead (LA) threshold value added to a select time duration over which the received ECM information is to be averaged is less than an end of media time associated with the media asset. If so, an average ECM value for media content over the select time duration is determined and a delivery weight parameter is computed as a function of the average ECM value and a preconfigured policy-defined weight to be used in a WFQ scheduling process for delivering the media content to the ABR client device. The computed delivery weight parameter is applied by the WFQ scheduling process for streaming the media asset to the ABR client device until all media segments referenced in the manifest are delivered. Relatedly, an apparatus configured to operate as a stream delivery server is disclosed wherein a processor and one or more persistent memory modules associated therewith may execute program instructions for performing an embodiment of the bandwidth management method set forth herein.

In an additional aspect, a client device may be configured to receive ECM catalog information in addition to manifest files responsive to a media download request. The client device may be further configured to execute program instructions to determine which segments to pull based on the complexity data. In still further aspects, one or more embodiments of a non-transitory computer-readable medium containing computer-executable program instructions or code portions stored thereon are disclosed for performing one or more embodiments of the methods set forth herein when executed by a processor entity of a edge network node, an upstream network node, or a client device, and the like. Further features of the various embodiments are as claimed in the dependent claims appended hereto.

Advantages of the present invention include, but not limited to, the ability to provide a consistent quality of service to end users (e.g., no jarring effects due to rapid changes in video quality due to greedy ABR client behavior) in a network environment. Significantly, embodiments set forth provide a better optimization and finer granularity in bandwidth management controls for ABR delivery without a noticeable QoS degradation. Additional benefits and advantages of the embodiments will be apparent in view of the following description and accompanying Figures.

BRIEF DESCRIPTION OF THE DRAWINGS

Embodiments of the present disclosure are illustrated by way of example, and not by way of limitation, in the Figures of the accompanying drawings in which like references indicate similar elements. It should be noted that different references to "an" or "one" embodiment in this disclosure are not necessarily to the same embodiment, and such references may mean at least one. Further, when a particular feature, structure, or characteristic is described in connection with an embodiment, it is submitted that it is within the knowledge of one skilled in the art to effect such feature, structure, or characteristic in connection with other embodiments whether or not explicitly described.

The accompanying drawings are incorporated into and form a part of the specification to illustrate one or more exemplary embodiments of the present disclosure. Various advantages and features of the disclosure will be understood from the following Detailed Description taken in connection with the appended claims and with reference to the attached drawing Figures in which:

FIGS. 5A-5E depict an example manifest, associated ABR representations encoded at multiple bitrates and complexity catalog information for an illustrative ABR streaming implementation according to an embodiment;

DETAILED DESCRIPTION OF THE DRAWINGS

Figure 1:
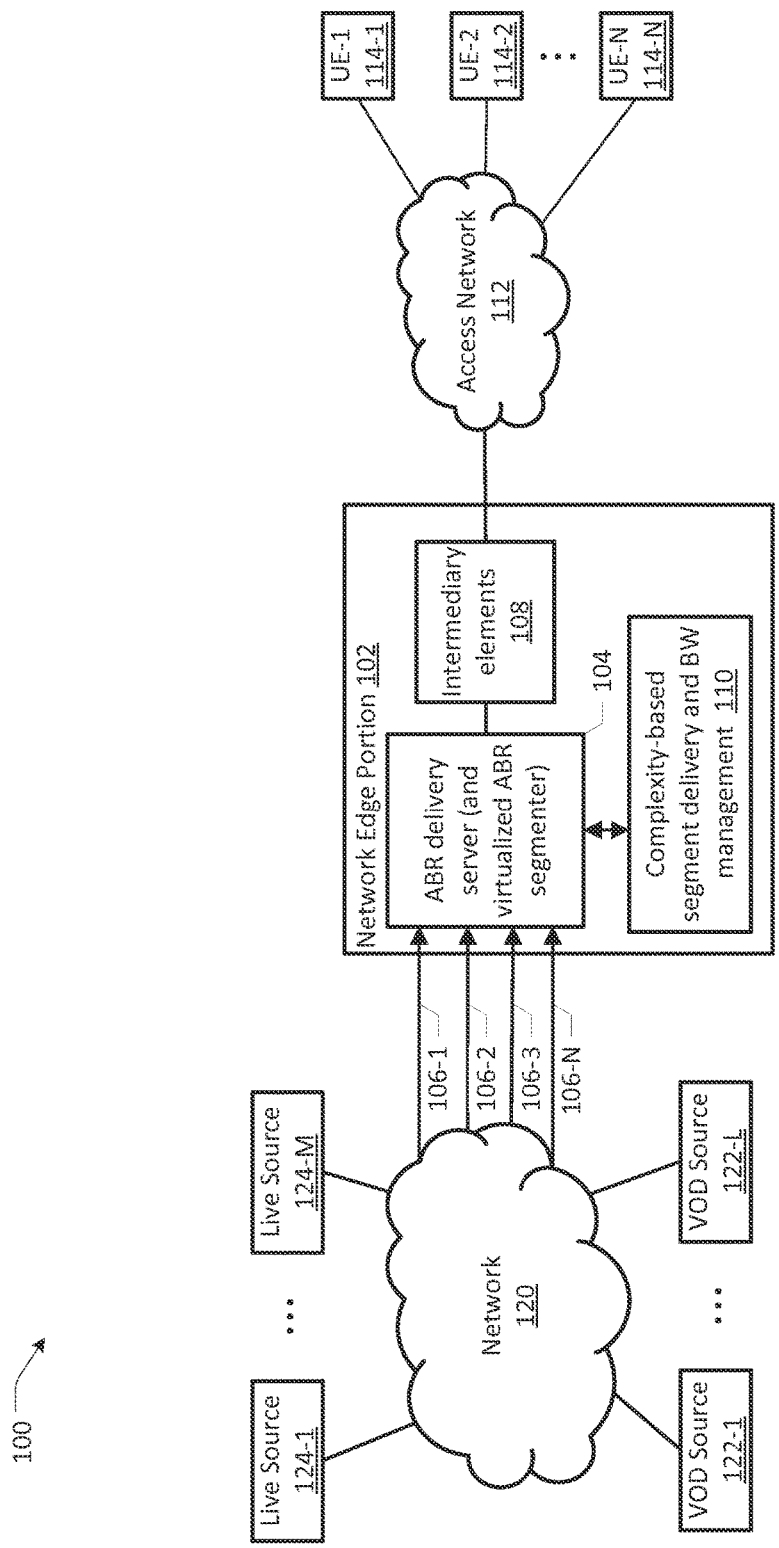
FIG. 1 depicts an example ABR network environment wherein one or more embodiments of the present invention may be practiced for controlling segment delivery and/or throttling bandwidth with respect to delivering a media asset responsive to encoding complexity information.

In the following description, numerous specific details are set forth with respect to one or more embodiments of the present patent disclosure. However, it should be understood that one or more embodiments may be practiced without such specific details. In other instances, well-known circuits, subsystems, components, structures and techniques have not been shown in detail in order not to obscure the understanding of the example embodiments. Accordingly, it will be appreciated by one skilled in the art that the embodiments of the present disclosure may be practiced without such specific components. It should be further recognized that those of ordinary skill in the art, with the aid of the Detailed Description set forth herein and taking reference to the accompanying drawings, will be able to make and use one or more embodiments without undue experimentation.

Additionally, terms such as "coupled" and "connected," along with their derivatives, may be used in the following description, claims, or both. It should be understood that these terms are not necessarily intended as synonyms for each other. "Coupled" may be used to indicate that two or more elements, which may or may not be in direct physical or electrical contact with each other, co-operate or interact with each other. "Connected" may be used to indicate the establishment of communication, i.e., a communicative relationship, between two or more elements that are coupled with each other. Further, in one or more example embodiments set forth herein, generally speaking, an element, component or module may be configured to perform a function if the element is capable of performing or otherwise structurally arranged to perform that function.

As used herein, a network element or node may be comprised of one or more pieces of service network equipment, including hardware and software that communicatively interconnects other equipment on a network (e.g., other network elements, end stations, etc.), and is adapted to host one or more applications or services with respect to a plurality of subscribers. As such, some network elements may be disposed in a wireless radio network environment whereas other network elements may be disposed in a public packet-switched network infrastructure, including or otherwise involving suitable content delivery network (CDN) infrastructure. Further, suitable network elements including one or more embodiments set forth herein may involve terrestrial and/or satellite broadband delivery infrastructures, e.g., a Digital Subscriber Line (DSL) architecture, a Data Over Cable Service Interface Specification (DOCSIS)-compliant Cable Modem Termination System (CMTS) architecture, a suitable satellite access architecture or a broadband wireless access architecture. Accordingly, some network elements may comprise "multiple services network elements" that provide support for multiple network-based functions (e.g., AN media delivery policy management, session control, QoS policy enforcement, bandwidth scheduling management based on weighted fair queuing (WFQ), subscriber/device policy and profile management, content provider priority policy management, streaming policy management, and the like), in addition to providing support for multiple application services (e.g., data and multimedia applications). Example subscriber end stations or client devices may comprise ABR client devices and/or non-ABR client devices, which may include progressive download client devices, for instance, and may be referred to simply as "clients" for short. Illustrative client devices may therefore include any device configured to execute, inter alia, a streaming client application for receiving and rendering content, either live media or static/on-demand media, from one or more content providers, e.g., via a broadband access network, in accordance with one or more streaming protocols and technologies such as, e.g., Microsoft® Silverlight® Smooth Streaming, HTTP streaming (for instance, Dynamic Adaptive Streaming over HTTP or DASH, HTTP Live Streaming or HLS, HTTP Dynamic Streaming or HDS, etc.), Icecast, and so on. Accordingly, such client devices may include set-top boxes (STBs), TVs, personal/digital video recorders (PVR/DVRs), networked media projectors, portable laptops, netbooks, palm tops, tablets, smartphones, multimedia/video phones, mobile/wireless user equipment, portable media players, portable gaming systems or consoles (such as the Wii®, Play Station 3®, etc.) and the like, which may access or consume content/services provided via a suitable high speed broadband connection for purposes of one or more embodiments set forth herein.

One or more embodiments of the present patent disclosure may be implemented using different combinations of software, firmware, and/or hardware. Thus, one or more of the techniques shown in the Figures (e.g., flowcharts) may be implemented using code and data stored and executed on one or more electronic devices or nodes (e.g., a subscriber client device or end station, a network element, etc.). Such electronic devices may store and communicate (internally and/or with other electronic devices over a network) code and data using computer-readable media, such as non-transitory computer-readable storage media (e.g., magnetic disks, optical disks, random access memory, read-only memory, flash memory devices, phase-change memory, etc.), transitory computer-readable transmission media (e.g., electrical, optical, acoustical or other form of propagated signals—such as carrier waves, infrared signals, digital signals), etc. In addition, such network elements may typically include a set of one or more processors coupled to one or more other components, such as one or more storage devices (e.g., non-transitory machine-readable storage media) as well as storage database(s), user input/output devices (e.g., a keyboard, a touch screen, a pointing device, and/or a display), and network connections for effectuating signaling and/or bearer media transmission. The coupling of the set of processors and other components may be typically through one or more buses and bridges (also termed as bus controllers), arranged in any known (e.g., symmetric/shared multiprocessing) or heretofore unknown architectures. Thus, the storage device or component of a given electronic device or network element may be configured to store code and/or data for execution on one or more processors of that element, node or electronic device for purposes of implementing one or more techniques of the present disclosure.

Referring now to the drawings and more particularly to FIG. 1, depicted therein is an example ABR streaming network environment 100 wherein one or more embodiments of the present invention may be practiced for controlling segment delivery, bandwidth allocation/management, or a combination thereof with respect to delivering a media asset to a client device responsive to encoding complexity information, among others. It will be realized that one or more embodiments set forth herein may be advantageously practiced in combination with other bandwidth management techniques, delivery optimization methodologies, etc., for example, responsive to a client's video buffer characteristics, client device/display characteristics and configurations, network/connection conditions, and the like, although it is not necessary that all such features be included in a particular embodiment. In general, the terms "media content," "media asset" or "content file" (or, simply "content") as used in reference to at least some embodiments of the present patent disclosure may include digital assets or program assets such as any type of audio/video content that may comprise live capture media or static/stored on-demand media, e.g., over-the-air free network television (TV) shows or programs, pay TV broadcast programs via cable networks or satellite networks, free-to-air satellite TV shows, IPTV programs, Over-The-Top (OTT) and Video-On-Demand (VOD) or Movie-On-Demand (MOD) shows or programs, time-shifted TV (TSTV) content, etc. By way of illustration, a plurality of live content sources 124-1 to 124-M and a plurality of static/on-demand content sources 122-1 to 122-L are shown in the streaming environment 100 that exemplify various such content sources. Media content from the content sources may be transmitted via a network 120 (e.g., an IP network using HTTP) as encoded content streams, which may be either segmented or unsegmented (i.e., non-segmented), to an edge network portion 102 (also sometimes referred to as "network edge") serving a plurality of UE devices 114-1 to 114-N. For example, reference numerals 106-1 to 106-N refer to a plurality of ABR segmented VOD streams, ABR segmented live media streams, as well as unsegmented VOD and live streams that are encoded in ABR-friendly manner. Appropriate manifest files with metadata information describing the multiple bitrates used for encoding content at different resolutions and Uniform Resource Locator (URL) pointers of various segments of encoded media content are also provided to the edge network infrastructure 102 for effectuating streaming sessions via an access network 112 that, for example, may be part of a DSL network architecture, a DOCSIS-compliant Cable Modem Termination System (CMTS) network architecture, a mobile telecommunications network architecture, and/or a CDN architecture. Accordingly, suitable intermediate elements such as routers, access multiplexers, CMTS nodes, etc., collectively shown as elements 108, may be provided in association with the network edge 102 for coupling with the access network 112.

Although not specifically shown in FIG. 1, at least a sub-group of UE devices 114-1 to 114-N may be operative as tethered or untethered customer premises equipment (CPE) devices associated with a subscriber premises in one example implementation. Regardless of the type of access network 112 or whether a UE device is part of a subscriber premises, a served UE device is operative as an ABR streaming client that may include one or more suitable media players configured to interoperate with applicable streaming protocols and technologies. As will be set forth in further detail below, an edge network node such as an ABR stream delivery server 104 may be advantageously provided with a complexity-based segment delivery and/or bandwidth management block or element 110 for parsing encoding complexity metrics (ECM) information received from an upstream ABR content server node for optimizing segment-by-segment delivery of content and/or modulating a bandwidth throttling scheme (e.g., based on one or more WFQ or other techniques) with respect to the streaming of a media asset requested by a particular UE device operating as an ABR client. In one arrangement, the ABR stream delivery server 104 is operative to provide a more optimized streaming service by modulating, modifying, and/or selecting appropriate bitrates of encoded media segments in a manifest (e.g., a master manifest and/or associated child manifests) for transmission in response to the complexity metrics associated with the media. Furthermore, where additional bandwidth optimization features based on network policy management, user-selected device policy configurations, automatic detection of UE device decoding/display capabilities, operator-supplied policies, etc., are implemented, it should be appreciated that appropriate service logic for bitrate/segment selection may be provided at a network level in combination with complexity-driven delivery management policies in an embodiment of the present disclosure. In such an arrangement, because the network node (e.g., ABR delivery server 104) has a broader awareness of the overall network conditions (e.g., upstream/north-bound and/or downstream/south-bound conditions) as well as respective UE devices' video player/buffer performance, a more consistent service quality may be achieved throughout the network.

In a further variation, a dynamic virtualized ABR segmenter may also be provided in conjunction with the ABR stream delivery server 104 for dynamically segmenting an incoming media content stream at appropriate locations, e.g., based on stream access points (SAPs) and associated timing information, e.g., presentation and decoding timestamps (i.e., PTSs/DTSs), etc., and virtualizing the segment representation in a random access memory (RAM) unit, that may be utilized in an embodiment of the present invention in order to facilitate manipulation and selection of appropriate bitrates/segments for purposes set forth herein. In a still further embodiment, a bandwidth controlled/monitored delivery system may also be provided or otherwise associated with the ABR stream delivery server 104 at a network edge in order to facilitate throttling of bandwidth allocation (e.g., based on WFQ techniques as pointed out previously) relative to a bandwidth pipe serving one or more subscribers or end stations.

Broadly, embodiments of the present disclosure employ one or more video quality metrics, which may be obtained, determined or otherwise computed as complexity information associated with a media asset according to known or heretofore unknown encoding/compression technologies, for controlling segment delivery by a stream delivery server, segment request by an ABR client device and/or for modulating parameters such as weights, priorities, etc., that are used in a bandwidth control/allocation scheme. It will be appreciated that encoding quality has a direct connection to the encoded bitrate for a given resolution group or class. For example, a low action newscast might look great encoded at 3 Mbps, 1080p resolution. However, the quality of a basketball game will be severely degraded at the same bitrate. This usually occurs as a result of the difference in changes from one frame to the next. A large difference between consecutive pictures, frames, fields, slices, etc., requires more data in order to reach the same quality as for a small inter-picture difference. Alternatively, the video quality at the same bitrate will be much lower when the difference between consecutive pictures is large compared to when the difference is small. As will be seen below, by exploiting such principles, a suitable quality metric may be applied to a bandwidth management scheme as well as delivery of segments across a particular resolution class in order to achieve overall improvement in bandwidth management and QoS. Accordingly, embodiments of the present disclosure are generally directed to providing what may be termed as "adaptive quality" in a streaming network environment. Benefits of a complexity-driven embodiment of the present invention may be illustrated even in a fairly simple example scenario where two users share a common bitrate pipe. Splitting the bitrate equally in this scenario is clearly inefficient if one user is watching complex video content such as a sports program while the other user is watching less complex content such as a slow-paced nature show. One skilled in the art will recognize upon reference hereto that the total video quality for both viewers would be higher in an arrangement where higher bitrate segments are delivered for the sports media asset while lower bitrate segments are used for the delivery of the nature show according to an embodiment disclosed herein.

It will be appreciated that the subject matter of the present disclosure pertains to a number of innovative features, systems and structures that may be arranged in various combinations and/or sub-combinations to implement different embodiments. A non-exhaustive list of example systems or features is as follows: A segmenter system or subsystem is disclosed in which during the segmentation of the ABR content, each segment is analyzed and a quality metric is computed. This metric is then defined for each segment produced in a complexity catalog which may be provided to a downstream node via a manifest or separately from the manifest. An encoder/transcoder system or subsystem is disclosed wherein video quality or complexity may be generated relative to a media asset, e.g., wherein calculations may be performed to determine ECM information between two timing reference points (e.g., PTSs/DTSs, SAPs, RAPs, program clock references (PCR) and system clock references (SCR), etc.), over a media file, including a block, portion, etc. The encoding complexity metrics or information (ECM) may be output from the encoder to a segmenter that is configured to catalog the received ECM information. In one arrangement, an example complexity catalog may contain a mapping between encoding complexity data and corresponding segments or other pieces of content. In another arrangement, a virtual segmentation system or subsystem configured to operate with a stream delivery server is disclosed wherein an encoding complexity quality calculation or mapping may be performed for each segment represented in memory, i.e., a quality value may be determined for each virtually represented segment. Based on the quality in a given resolution grouping from a client's requested segment, optimal segments determined according to a suitable encoding complexity threshold metric may be delivered to the client regardless of which segment the client actually requested in contrast to delivering segments based on calculated bandwidth only. In a still further arrangement, a WFQ-based bandwidth control system or subsystem is disclosed wherein a Look Ahead (LA) horizon may be used in delivery of VOD content and determine how bandwidth should be altered/allocated based on a combination of incoming policies combined with the ECM information over a defined period of time in the future. In one implementation, the system calculates and adjusts suitable bandwidth weighting factors in time for the client device to act on a bandwidth change based on the calculated encoding complexity defined for that time period. In a combination arrangement, the bandwidth may be controlled for a larger duration such as over a period of several minutes (e.g., 5 minutes, 10 minutes, etc.) wherein once a WFQ weight factor is calculated and the client device settles on a resolution class (e.g., based on a given profile in the manifest), a selective segment delivery may be applied on a segment-by-segment basis. In such an arrangement, for instance, the best segment within the same resolution grouping/class may be delivered to the client regardless of which segment the client requests. In yet another arrangement, a client device may be configured to receive an ECM catalog, e.g., using a standard ABR delivery system or via some other out-of-band or sideband communication mechanism, with respect to streaming a media asset, e.g., live content or VOD content. The client device may be configured to perform bandwidth computations to settle in on a set of segments to download according to known methodologies. Once the segment to download based on bandwidth is determined, the client device may be configured to examine the encoding complexities across all of the bitrates in a resolution class/grouping and select the optimal segment to request. These and other example arrangements will be set forth in additional detail hereinbelow.

Figure 2:
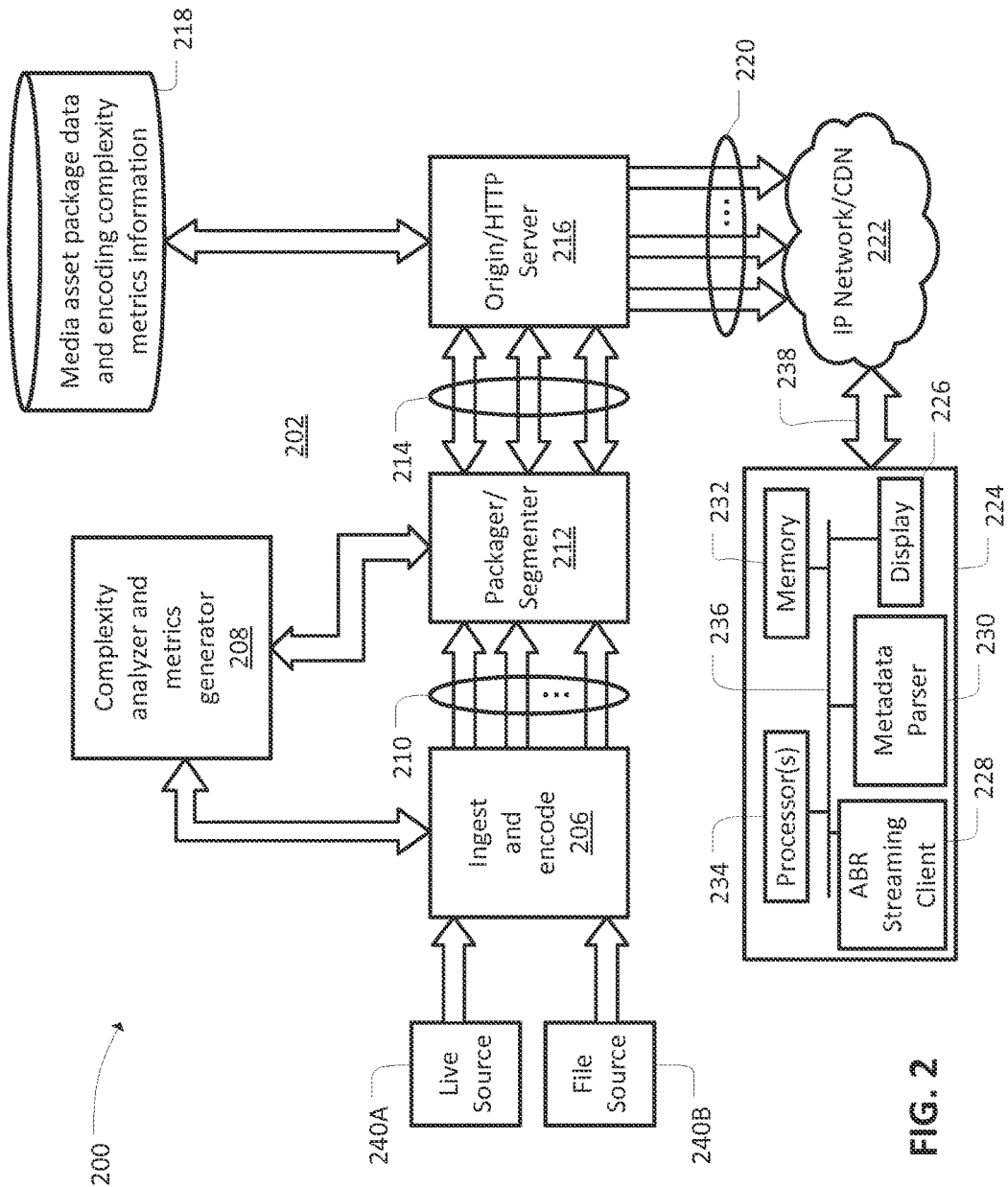
FIG. 2 depicts another aspect of an example ABR network environment with additional elements illustrated according to an embodiment.

FIG. 2 depicts another aspect of an example ABR network environment 200 with additional elements for purposes of one or more embodiments of the present disclosure, wherein an IP network and/or an overlay content delivery network or content distribution network (CDN) 222 coupled to an adaptive streaming server system 202 is illustrated. In one implementation, CDN 222 may comprise a delivery architecture over a public or private packet-switched network (e.g., the Internet) for facilitating high-performance streaming of a variety of media assets or program assets to an example ABR client device or UE device 224. It will be apparent that one or more such client devices may be associated with a subscriber/customer for consuming content delivered via CDN 222 in any type or number of access technologies including broadband access via wired and/or wireless (radio) communications. For purposes of the present patent application, the terms "streaming client device" and "client device" may be used synonymously and may comprise any UE device or appliance that in one implementation not only receives program assets for live viewing, playback and/or decoding the content, but also operates as a command console or terminal that can accept user inputs, messages, commands or requests to interact with a network element disposed in IP/CDN 222 and/or associated streaming server systems for controlling transmission of content via a bidirectional interface. By way of illustration, the example client device 224 may include one or more streaming client modules 228 (e.g., an ABR streaming client) and associated decoding functionalities depending on the streaming technologies implemented (e.g., HLS, MPEG-DASH, etc.) as well as a metadata parser module 230 operative to parse ECM information received via a communication interface 238 to the IP/CDN 222. As will be seen below, the ECM information may comprise complexity data that may be computed according to a number of techniques based on the type(s) of source video codecs (e.g., H.264, MPEG varieties, High Efficiency Video Coding or HEVC (H.265), and the like) operating in association with a content server system 202. The streaming client module(s) 228 and the metadata parser module 230 are operably coupled to one or more processors 234 and memory module(s) 232 via a suitable bus structure 236 for effectuating acquisition, decoding and rendering of the streamed media content, e.g., at a display 226. Although not specifically shown, memory 232 is illustrative at least of a video buffer memory as well as one or more persistent memory modules containing program instructions for execution by the processors 234 in order to effectuate one or more client-controlled segment-delivery processes set forth in additional detail further below. The ABR client device 224 may also include appropriate user interfaces for viewing one or more electronic program guides that list, identify or otherwise show various streaming channels (live media and/or on-demand) the subscriber is able to receive. Such user interfaces may also be configured to allow the user to scroll through an electronic program guide (i.e., channel surfing), select or otherwise change a particular streaming channel, and the like.

Continuing to refer to FIG. 2, the example adaptive streaming server system 202 may be configured to accept media content from live sources 204A and static file sources 204B at an ingest/encode block 206. Where an input media stream is already encoded or compressed, block 206 may be configured to operate as a transcoder so that one or more ABR representations of the media content at suitable bitrates may be generated. In general operation, the example streaming server system 202 may be configured, under the control of one or more processors executing appropriate program code stored in a persistent memory module (not specifically shown), to effectuate adaptive streaming of content as follows. Initially, source media content is transcoded or otherwise encoded with different bit rates (e.g., multi-rate transcoding) using applicable encoder(s) 206. For example, content of a particular media asset may be transcoded into five video files using variable bit rates (or, synonymously "bitrates" or "representations"), ranging from low to high bit rates (500 Kbps to 10 Mbps, by way of illustration). The particular content is therefore encoded as five different "versions" or "formats", wherein each bitrate is called a profile or representation. Reference numeral 210 refers to a collection of media streams encoded at different bitrates by the encoder 206. A segmentation/packager 212 is operative to divide each version of the encoded media content into fixed duration segments or chunks, which may be between two and ten seconds in duration, thereby generating a plurality of chunk streams 214. One skilled in the art will recognize that shorter segments may reduce coding efficiency whereas larger segments may impact the adaptability to changes in network throughput and/or fast changing client behavior. Furthermore, segment sizing may also impact ECM data computations. Regardless of the chunk size, the segments may be Group-of-Pictures (GOP)-aligned such that all encoding profiles have the same media segment data with properly aligned timing boundaries. One or more suitable metadata files referred to as manifest files are created that describes the encoding rates and Uniform Resource Locator (URL) pointers the various segments of encoded content. A complexity analyzer and metric generator block 208 may be configured to operate at the encode/transcode level or at the segmentation/packaging level in order to generate appropriate ECM information depending on a particular embodiment. An origin/HTTP server 216 is operative to receive the encoded media streams 214, associated manifest files as well as the ECM information, which may be stored at a database 218 for facilitating complexity-driven delivery of the media to the requesting clients 224 via IP/CDN 220, illustrated as adaptive streams 220.

In accordance with the teachings herein, encoding complexity can be calculated by several different methods. One class of methods includes calculations done by an encoder and/or transcoder. The output complexity metric value(s) from the encoder may signaled from the encoder to the segmenter/packager (e.g., segmenter/packager 212 in FIG. 2), which may be stored together with the media streams or on the local/network storage or CDN delivery node. Another class of methods comprises computations performed on already compressed data. Here, the complexity evaluation does not involve using the source video input but instead the compressed video data is analyzed. Further, example ECM data can be of two types: Type 1 in which a single complexity metric may be used for all bitrates and Type 2 in which each segment has an individual complexity value.

Regardless of the typology and/or classification of ECM computation techniques, the following list comprises embodiments illustrative of some specific techniques that may be used in one or more arrangements of the present disclosure. In a first embodiment, video complexity may be calculated by an entity based on a Mean Opinion Score or MOS for a media file (or a section thereof). For example, a video coding complexity metric may be determined as an estimated bitrate to reach a certain MOS score for the video (e.g., based on objective modeling). Assuming a sequence A of video pictures that is estimated to require 4 Mbps to reach a certain MOS score and a sequence B of video pictures that is estimated to require 2 Mbps to reach the same MOS score, the ECM entity may determine a higher estimated ECM for set A than set B. In one arrangement, the ECM entity may be operative as part of a video encoder that compresses or transcodes one or many input video signals and outputs compressed video data together with estimated video complexity metric values. In another arrangement, the ECM entity may be configured as a video analyzer that takes one or many input compressed video signals and outputs estimated video complexity metric values.

In a second embodiment, a video encoder may be configured to compute, obtain or otherwise determine estimated video complexity metric value(s) by encoding or transcoding the input video using a static compression setting where video encoder quantization settings are kept static while allowing the output bitrate to vary. The quantization parameters (QPs) may either be fixed to the same value for all pictures, or allowed to vary by picture type and/or picture position in a GOP, similar to the common coding conditions and encoder settings that may be utilized in an HEVC scenario. The estimated ECM value(s) may be based on bitrate values or bit counts for compressing a sequence of input video pictures. The compression on which the estimation is based may be done in a look-ahead or pre-processing part of the encoder and not be part of the compression that is done for outputting compressed video data.

Depending on implementation, the estimated video metric value(s) may comprise either single values from a certain static set of quantization values or multiple values from multiple static set of quantization values. An example of two static sets of quantization values are shown below for a hierarchical B-picture structure of pictures:

TABLE I

| Set A |
|---|
| Use quantization parameter value (QP) equal to 30 for I-pictures |
| Use QP equal to 31 for reference B-pictures |
| Use QP equal to 32 for non-reference B-pictures |
| Set B |
| Use QP equal to 34 for I-pictures |
| Use QP equal to 35 for reference B-pictures |
| Use QP equal to 36 for non-reference B-pictures |

In a third embodiment of the present disclosure, a video encoder may be configured to compute or otherwise determine estimated video complexity metric value(s) by performing full reference MOS estimations while encoding or transcoding using a set of ABR target bitrates. It should be appreciated that this embodiment may be considered as a further refinement of the first ECM embodiment described above in that ECM values here may be computed on segment-by-segment basis. Full reference MOS estimations include using both the source input video pictures as well as the reconstructed (i.e., the decoded) video pictures for each target bitrate. As an example, consider an encoder that transcodes an input stream to a set of ABR streams ranging from 500 kbps to 13 Mbps. For each output segment per bit stream, the encoder computes an estimated MOS score. Non-limiting examples of MOS score estimations include Peak Signal-to-Noise Ratio (PSNR), Structural Similarity (SSIM) index, Mean Square Error (MSE), PSNR-HVS-M (Human Visual System), Multi-scale SSIM, in addition to using temporal and spatial activities as defined in the ITU-R BT 1788 specification, incorporated by reference herein. Accordingly, in this embodiment, ECM data may be deemed to be equal to estimated MOS scores or values and/or other related parameters.

In a frame-rate based ECM entity implementation, a fourth embodiment involves a video analyzer that may be configured to compute or otherwise determine estimated video complexity metric value(s) by extracting the frame rate of the input video from the compressed video stream. It should be appreciated that in general if an ECM generation technique can be performed by a video analyzer, such a technique can also be performed by a video encoder since it receives a higher quality input signal. However, the converse is not true, i.e., a technique implemented at a video encoder is generally not susceptible to implementation at a video analyzer. In this particular embodiment, the ECM entity (e.g., a video analyzer) may be operative to generate a higher video complexity metric value for higher frame rates than lower frame rates. For example, an input frame rate of 60 frames per second (fps) is given a higher complexity value than an input frame rate of 24 fps. The video analyzer may also be configured to analyze the video to determine whether post-production telecine techniques such as, e.g., 3:2 pull-down have been used to convey originally lower frame rate video such as 24 fps in seemingly higher frame rate video streams such as 60 fps. Non-limiting examples of determination methods for detecting such "conversion" techniques could be parsing of video or system headers, or detecting variations in compressed picture sizes, and the like. Detecting 3:2 pull-down through compressed picture sizes for the 60-to-24 fps case could be done by detecting a pattern of five consecutive pictures where two are relatively large and three are small. For example, the picture pattern will be {XyyXyXyyXyXyyXyXyyXy} where {X} is a large compressed picture and {y} is a small compressed picture. The {X} pictures become large since they correspond to a 24 fps picture change and the {y} pictures become small since they do not convey any picture change but merely a repetition of the previous picture information.

In a fifth embodiment of example ECM generation methodology, a video analyzer may be configured to compute or otherwise determine estimated video complexity metric value(s) without using a full reference, i.e., access to either the full or part of the compressed bit stream is available but not to the source input video signal. One such metric may be based on extracting quantization parameter (QP) values from the bit streams associated with a media asset. Either all QP values for all blocks in the pictures are extracted or only a sub-set such as the first QP value found in each picture is extracted. The QP values may then be averaged, e.g., averaging within pictures in the case of extracting multiple QP values from single pictures, and/or averaging QP values from several pictures. It is also possible to extract QP values from a sub-set of pictures instead of using all pictures. Such a sub-set could consist of, e.g., only all random access point (RAP) pictures, or only all pictures belonging to the lowest temporal layer, or all pictures except non-reference pictures, or all pictures except non-reference pictures of the highest temporal layer, or combinations thereof.

As an example, consider an encoder that transcodes an input stream to a set of ABR streams ranging from 500 kbps to 13 Mbps. For each output segment, the analyzer may be configured to compute a video complexity metric value based on extracted QP values as described above.

In a sixth embodiment, a video analyzer may be configured to compute or otherwise determine estimated video complexity metric value(s) by analyzing relative compressed picture sizes without using a full reference. It is a characteristic of video compression or coding that low complexity video results in a higher variation of compressed picture sizes. Accordingly, video sequences that consist of low motion scenes result in larger compressed RAP pictures and smaller non-RAP pictures compared to high motion scenes. A video complexity metric value or ECM information may therefore be calculated based on compressed picture size variations, such as, e.g., the variance of a sequence of compressed picture sizes such that a high variance gives a low complexity metric value and a low variance gives a high complexity metric value.

One skilled in the art will recognize that the example ECM generation embodiments enumerated above are illustrative rather than limiting and that they may be combined in various combinations to give rise to additional or alternative embodiments. As an example, fourth and sixth embodiments can be combined to obtain a possible seventh embodiment as shown in the table below.

TABLE II

| Complexity metric value | 24 fps input | >24 fps input |
|---|---|---|
| High variance | Very low complexity | Medium complexity |
| Low variance | High complexity | Very high complexity |

Clearly, other combinations are also possible that may be utilized in one or more arrangements within the scope of the present disclosure. Further, although the terms "analyzer" and "encoder" are used in certain embodiments, other entities may also be configured to compute, determine or otherwise obtain the video complexity metrics or ECM data, which entities may be disposed at different locations in a streaming network environment. For instance, the ECM estimation done by an analyzer or encoder of an embodiment may be done by an encoder, an analyzer, a segmenter, or any other entity that has access to the video signal and/or source input video pictures, although placing the ECM estimation functionality farther downstream (from the source media) would generally result in a less efficient and scalable architecture.

Figure 3:
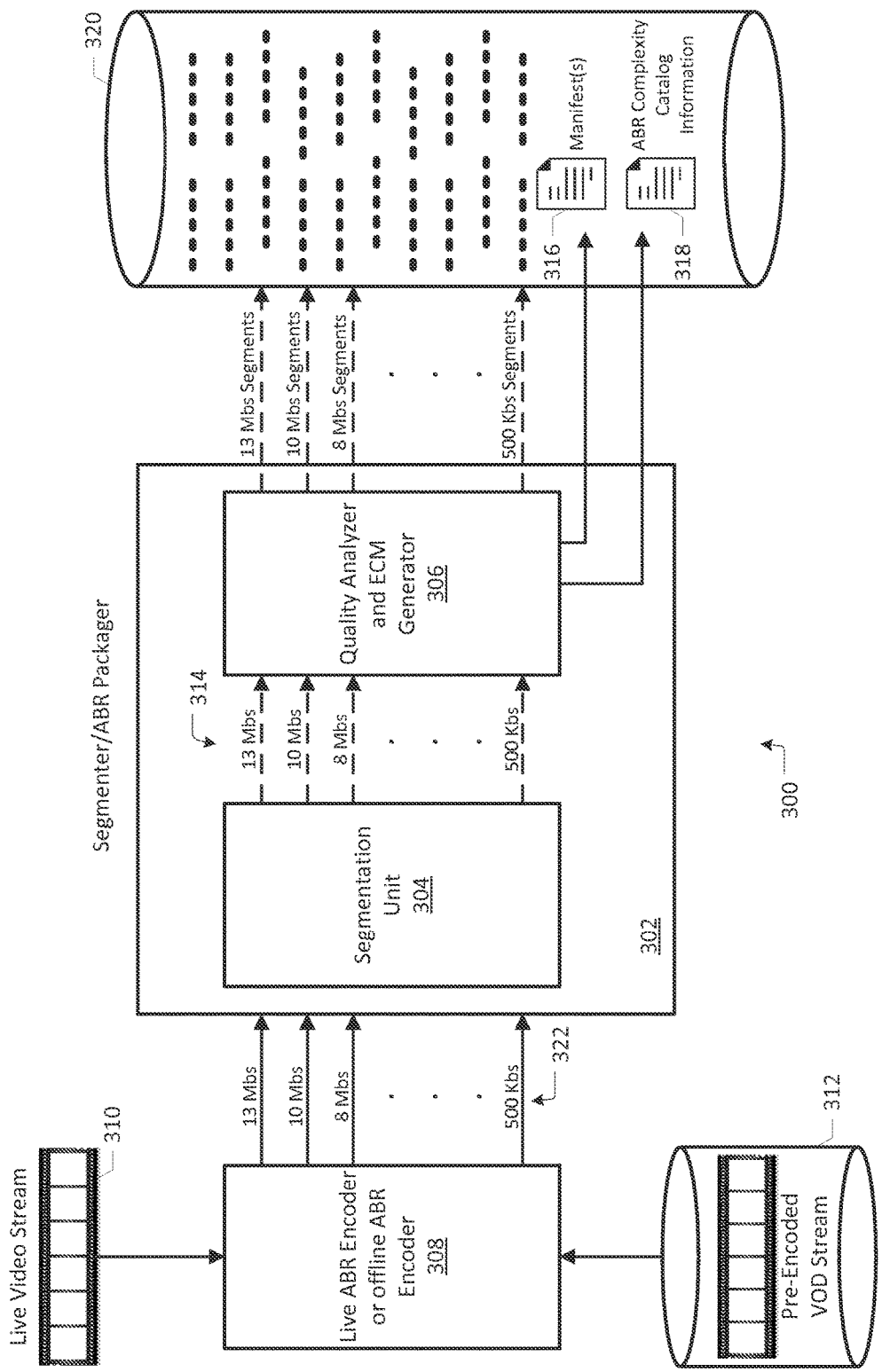
FIG. 3 depicts an example ABR segmentation/packaging system operative an ABR network environment according to an embodiment.

Turning now to FIG. 3, depicted therein is an example ABR segmentation/packaging system 302 operative in an ABR network portion 300 according to an embodiment. One skilled in the art will recognize that the network portion 300 is illustrative of—and may be implemented as—a portion of an end-to-end ABR environment exemplified in FIGS. 1 and 2 above, and as such, pertinent parts of their description are generally applicable here as well, mutatis mutandis. Segmenter/packager 302 is comprised of a segmentation unit 304 operative to receive a plurality of encoded/transcoded ABR bit streams 322 provided by an ABR-friendly encoder 308 which may be a live ABR encoder operative with respect to live video source streams 310 or an offline ABR encoder/transcoder operative with respect to stored VOD streams 312 (which may be pre-encoded). By way of illustration, encoded non-segmented ABR bit streams 322 may comprise nine streams or representations, each encoded at a particular bitrate, e.g., 500 Kbs (i.e., "kilobits per second"; also sometimes referred to as Kbps or Kb/s) to 13 Mbs (i.e., "megabits per second"; also sometimes referred to as Mbps or Mb/s). Segmenter 304 may be configured to generate segments according to one or more ABR protocols/formats (e.g., MP4 fragments, MPEG-2 TS, etc.), with segment lengths having flexible and/or fixed durations, including appropriate timing reference points, e.g., SAPs, to provide corresponding segmented data streams 314 which may be fed to a video quality analyzer and ECM generator block 306. In one example configuration, the video quality analyzer and ECM generator 306 is operative to implement any of the ECM techniques, or suitable combinations thereof, described above. For instance, ECM computations may be effectuated over applicable timing reference points, across all bitrate segments per each stream. As appropriate manifest files (master manifest files and/or child manifest files) are generated and the media segments are produced, one or more complexity catalog files may also be generated, which define or include the ECM data for all the segments being processed across the bitrates. A suitable database 320 disposed as local or network storage or in association with a CDN origin server is operative to receive ABR media asset package data including the encoded/segmented media fragments, manifest files 316 and ABR complexity catalog information 318, which may be provided to downstream nodes (e.g., at an edge network) for effectuating streaming of media content pursuant to streaming session requests from ABR client devices.

Figure 4A:
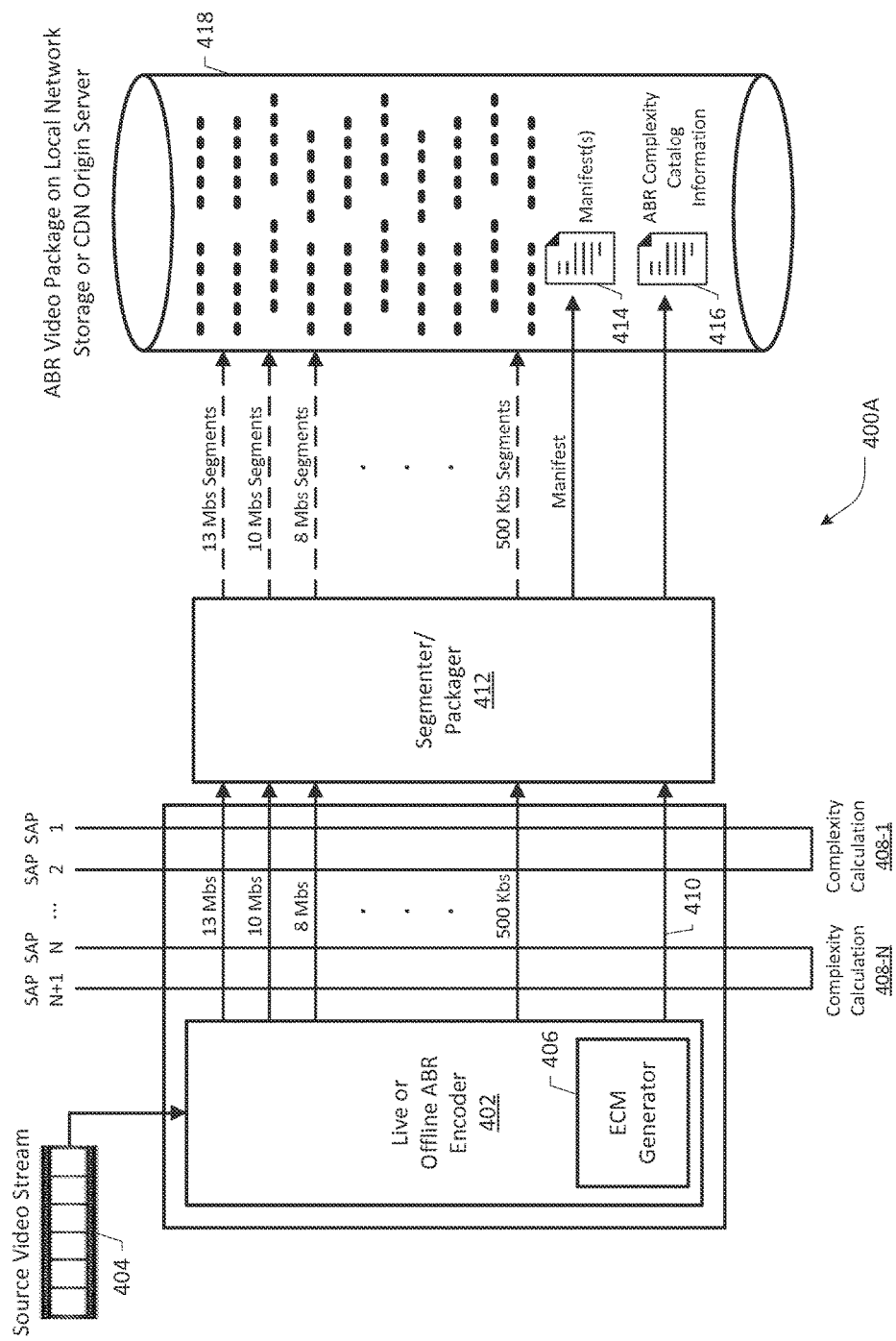
FIGS. 4A and 4B depict further embodiments of segmentation/packaging systems operative in an example ABR network.
Figure 4B:
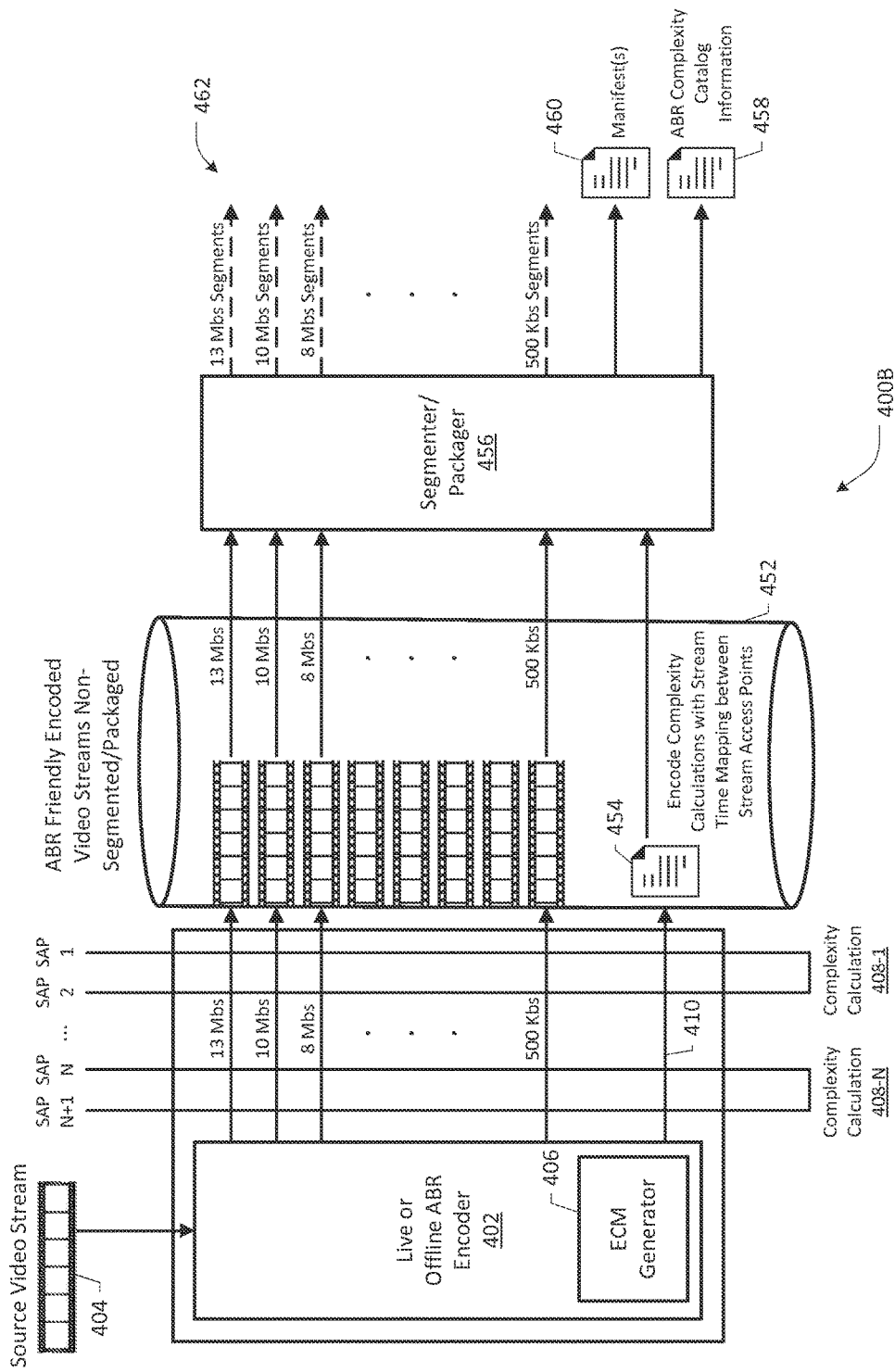

FIGS. 4A and 4B depict further embodiments of segmentation/packaging subsystems operative in an example ABR network portion wherein ECM analysis/generation functionality is provided at encoding. An encoder/transcoder block 402 is operative to receive and encode source video streams 404 and an ECM generator 406 operating in conjunction with the encoding process is configured for generating ECM data between suitable timing reference points. As illustrated in FIGS. 4A and 4B, complexity metric data 408-1 to 408-N corresponding to N timing intervals (e.g., N inter-SAP durations) across all bitrates are provided by the ECM generator 406. Depending on the output of the encoder format, other timing intervals may also be used, e.g., RAPs, PTSs/DTSs, PCRs, including sub-SAP intervals, etc., as pointed out previously. As is known, a segmenter/packager is operative to parse the timing information in the encoded bit streams to generate segments of appropriate durations, wherein durations are typically integer multiples of a timing interval configured to achieve boundary alignment.

Embodiment 400A in FIG. 4A is illustrative of an implementation of on-the-fly segmentation, where a segmenter/packager 412 could be provided as part of an encoder 402 or as a standalone entity that receives the encoded bit streams as well as ECM information 410 via network transmission. Similar to the embodiment shown in FIG. 3, ABR media asset package data including the encoded/segmented media fragments, manifest files 414 and ABR complexity catalog information 416 are provided by the segmenter/packager 412 to a suitable database 418 disposed as local or network storage or in association with a CDN origin server. Embodiment 400B in FIG. 4B is illustrative of a scenario where the encoder/transcoder 402 generates the ECM information and provides it to a network storage or CDN storage 452 along with ABR-friendly encoded streams that have not yet been segmented or packaged. In this case, the stored ECM data 454 comprises complexity metrics based on timestamps corresponding to SAP (or other timing) intervals and are mapped accordingly. At segmentation/packaging, segmenter 456 is configured to read the encoded streams and output suitable manifest file(s) 460, media segment streams 462 and a corresponding complexity catalog 458 specific to the segmentation process.

Figure 5A:
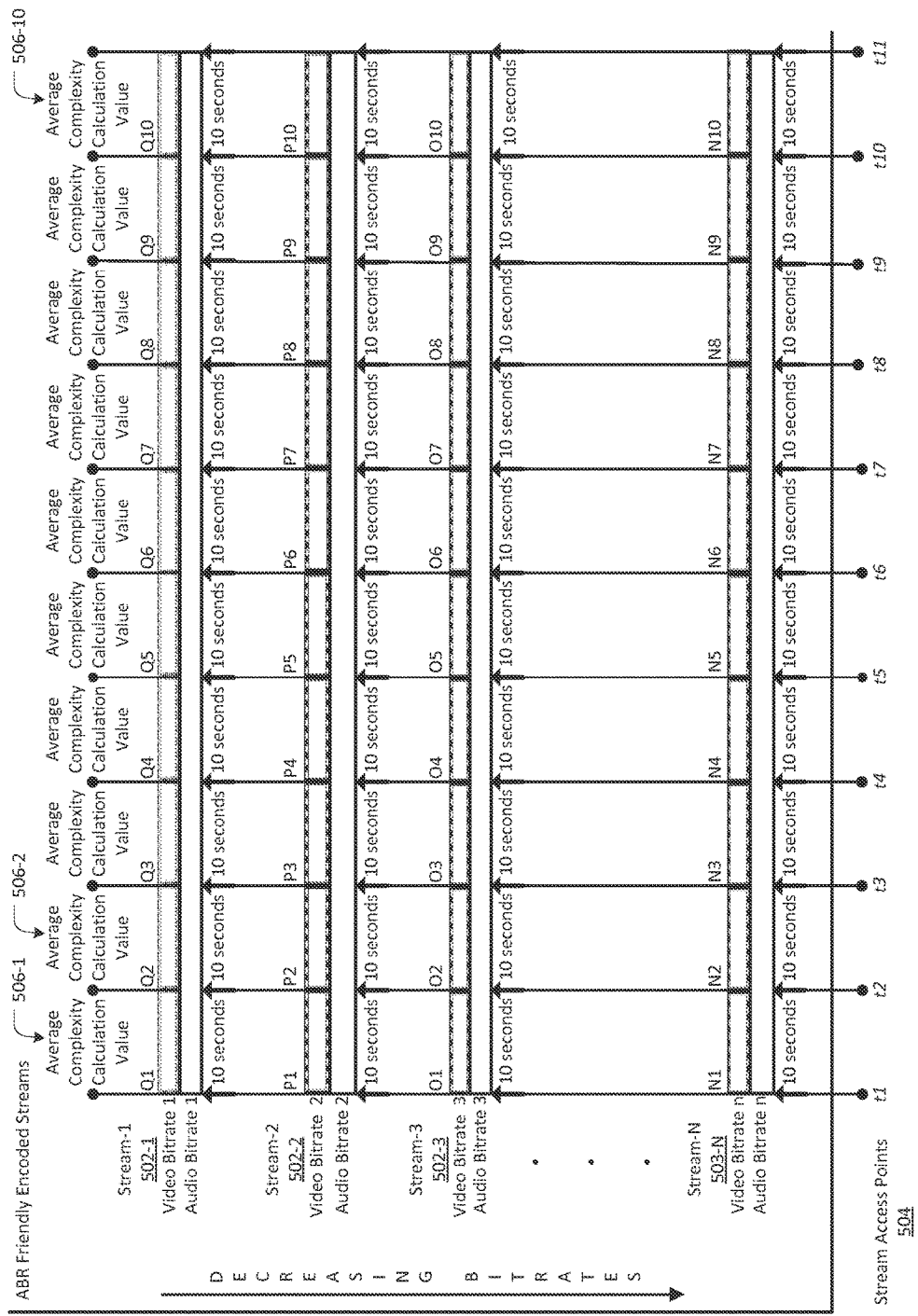

FIGS. 5A-5E depict an example manifest, associated ABR representations encoded at multiple bitrates and complexity catalog information for an illustrative ABR streaming implementation (e.g., HLS) according to an embodiment. Reference numeral 500A in FIG. 5A refers to a group of bit streams 502-1 to 502-N corresponding to a media asset, each encoded at specific video and audio bitrates, wherein average complexity data obtained over a select duration of the video bit stream (e.g., inter-SAP duration) may be referenced in a suitable file. Illustratively, SAPs t1 to t11 are shown in the encoded bit streams, thereby giving rise to ten ECM data values 506-1 to 506-10 for each bit stream. For stream-1 502-1, these values are illustratively shown as Q1-Q10. In similar fashion, P1-P10 refer to the complexity values for stream-2 502-2; O1-O10 refer to the complexity values for stream-3 502-3; and N1-N10 refer to the complexity values for stream-N 502-N. Reference numeral 500B in FIG. 5B refers to an example manifest containing metadata information corresponding to each of the N streams 502-1 to 502-N, wherein each stream's metadata may be further illustrated in corresponding data structures in additional detail. For example, metadata 500C corresponding to higher-bitrate-encoded stream 502-1 (e.g., 13.0 Mbs) is illustrated in FIG. 5C. Likewise, metadata 500D corresponding to lowest-bitrate-encoded stream 502-N (e.g., 500 Kbs) is illustrated in FIG. 5D. Reference numeral 500E refers to a complexity catalog file comprising ECM data for each segment across all bitrates/resolutions in the segment list identified in the manifest. As noted elsewhere, complexity catalog information may be provided as part of a manifest file (either in a master manifest or a child manifest) or as a separate file, which may be transmitted via additional/alternative communication channels other than a streaming channel. For example, industry-standard specifications such as MPEG-DASH, etc., may be modified to include the complexity catalog information in the manifest.

Figure 6A:
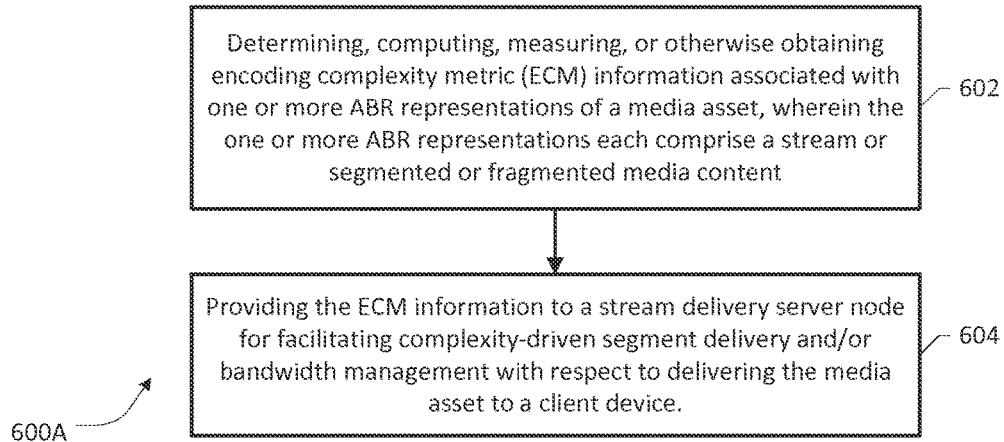
FIGS. 6A and 6B depict flowcharts of steps, acts, blocks and/or functions that may take place relative to an illustrative process for managing segment delivery and/or bandwidth throttling according to an example embodiment.
Figure 6B:
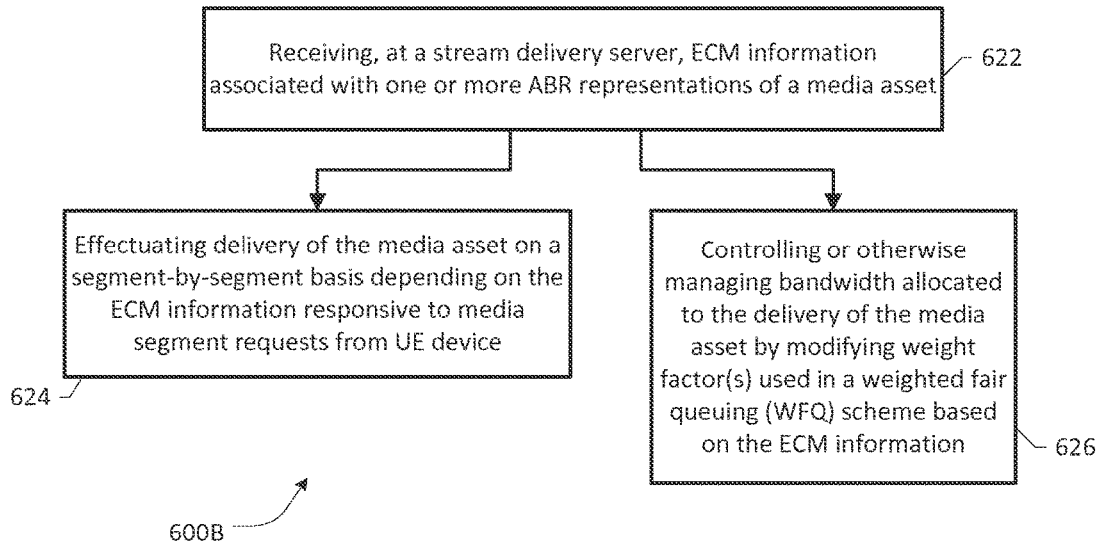

FIGS. 6A and 6B depict flowcharts of steps, acts, blocks and/or functions that may take place relative to an illustrative process for managing segment delivery and/or bandwidth throttling according to an example embodiment. With respect to exemplary process 600A in FIG. 6A, at block 602, appropriate service logic executing at a network node is operative to determine, compute, measure, estimate, or otherwise obtain suitable ECM information associated with one or more ABR representations of a media asset, wherein the one or more ABR representations each comprise a stream of segmented or fragmented media content. At block 604, the network node is operative to provide the ECM information to a stream delivery server node for facilitating complexity-driven segment delivery and/or bandwidth management with respect to delivering the media asset to a requesting client device.

Example process 600B is illustrative of steps, acts, functions and/or blocks that may take place at an ABR stream delivery server. Appropriate service logic executing at the delivery server or subsystem is operative to facilitate receiving of ECM information associated with one or more ABR representations of a media asset (block 622). Depending on implementation, the stream delivery server may be configured to effectuate streaming of the media asset on a segment-by-segment basis, taking into account the ECM catalog information (block 624). As will be seen below, the received ECM catalog information may be parsed by a parser functionality operating in conjunction with the segment delivery process in order to facilitate selection of an optimal segment within a resolution class for delivery, responsive to media segment requests from a UE device. In another arrangement, the delivery server may be configured to interoperate with a bandwidth control/management system in order to efficiently allocate bandwidth with respect to the delivery of a media asset, e.g., by modifying weights used in a WFQ scheme based on the ECM information (block 626). As noted previously, a dynamic virtual segmentation system may be provided in conjunction with segment delivery and/or bandwidth management as part of further embodiments of the present disclosure.

Figure 7:
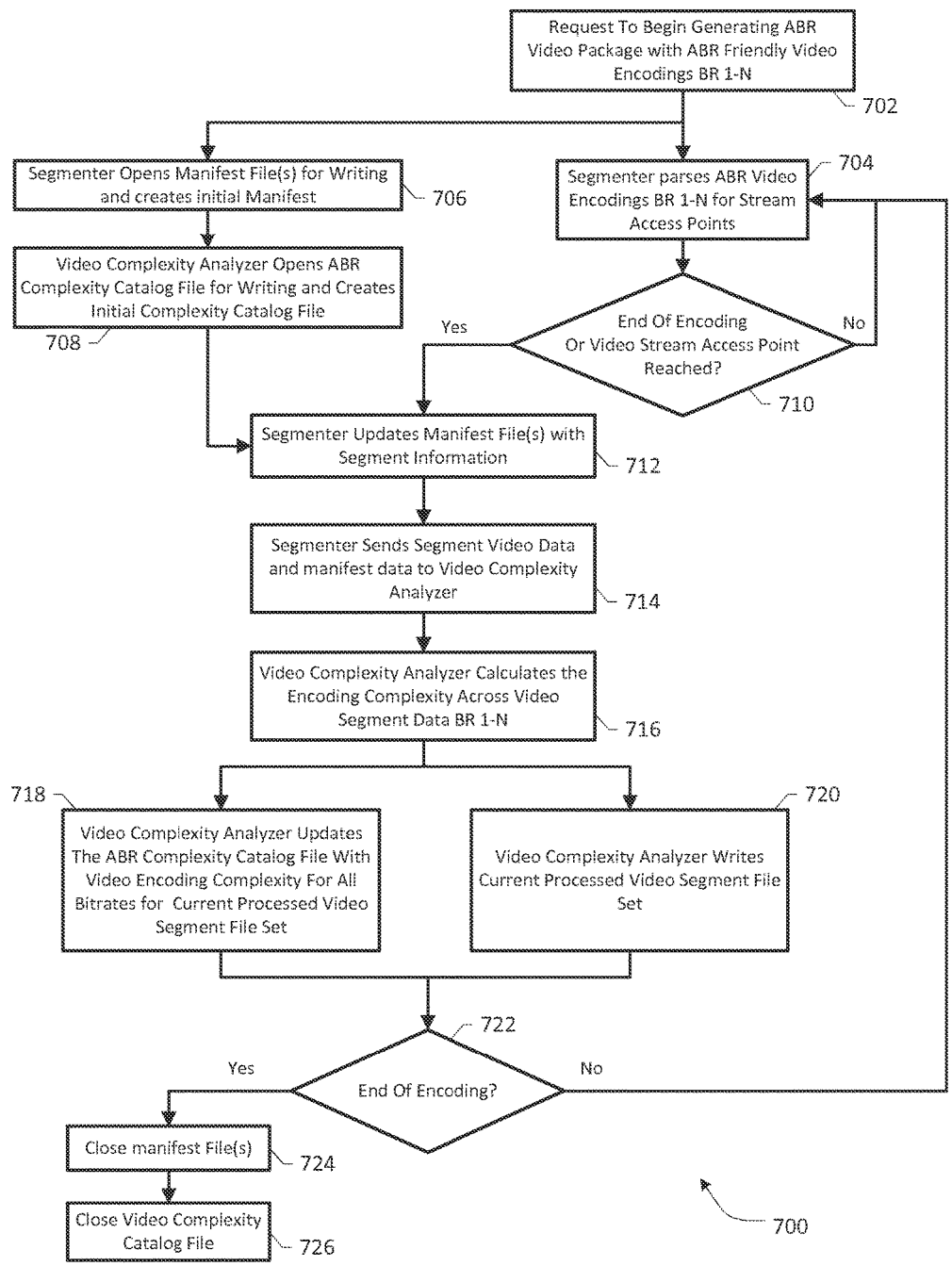
FIG. 7 depicts a flowchart of steps, acts, blocks and/or functions that may take place relative to an illustrative process for generating or otherwise obtaining encoding complexity metrics (ECM) information during segmentation of a media asset according to an example embodiment.

FIG. 7 depicts a flowchart of an illustrative process 700 in additional detail for generating or otherwise obtaining ECM information during segmentation of a media asset according to an example embodiment. At block 702, a request to begin generating an ABR media package having ABR-friendly encoded bit streams at BR-1 to BR-N is generated and/or received. A segmenter parses ABR encoded bit streams (block 704) for appropriate timing reference information (e.g., SAPs). Also, one or more manifest files may be opened by the segmenter for writing and creating initial manifest information (block 706). A complexity analyzer (i.e., ECM generator) opens an ABR complexity catalog file for creating and writing initial ECM information (block 708). The segmenter continues to parse the encoded bit streams until the end of encoding or SAP is reached (block 710). Thereafter, the segmenter updates the manifest file(s) with segment information (block 712) and forwards segment data as well as manifest data to the ECM generator/analyzer (block 714), which analyzes and computes the complexity metrics across all bitrates (block 716). As noted previously, segmentation may be provided as a post-encoding process and ECM data may be generated in accordance with applicable ECM techniques. At block 718, the ECM generator/analyzer updates the ABR complexity catalog file with the calculated ECM data corresponding to the currently processed segments files for all bitrates. Also, the ECM generator/analyzer writes the currently processed segments to a processed file set (block 720). Upon determining that encoding has completed (block 722), updated manifest file(s) and complexity catalog file(s) are appropriately closed (blocks 724, 726).

Figure 8:
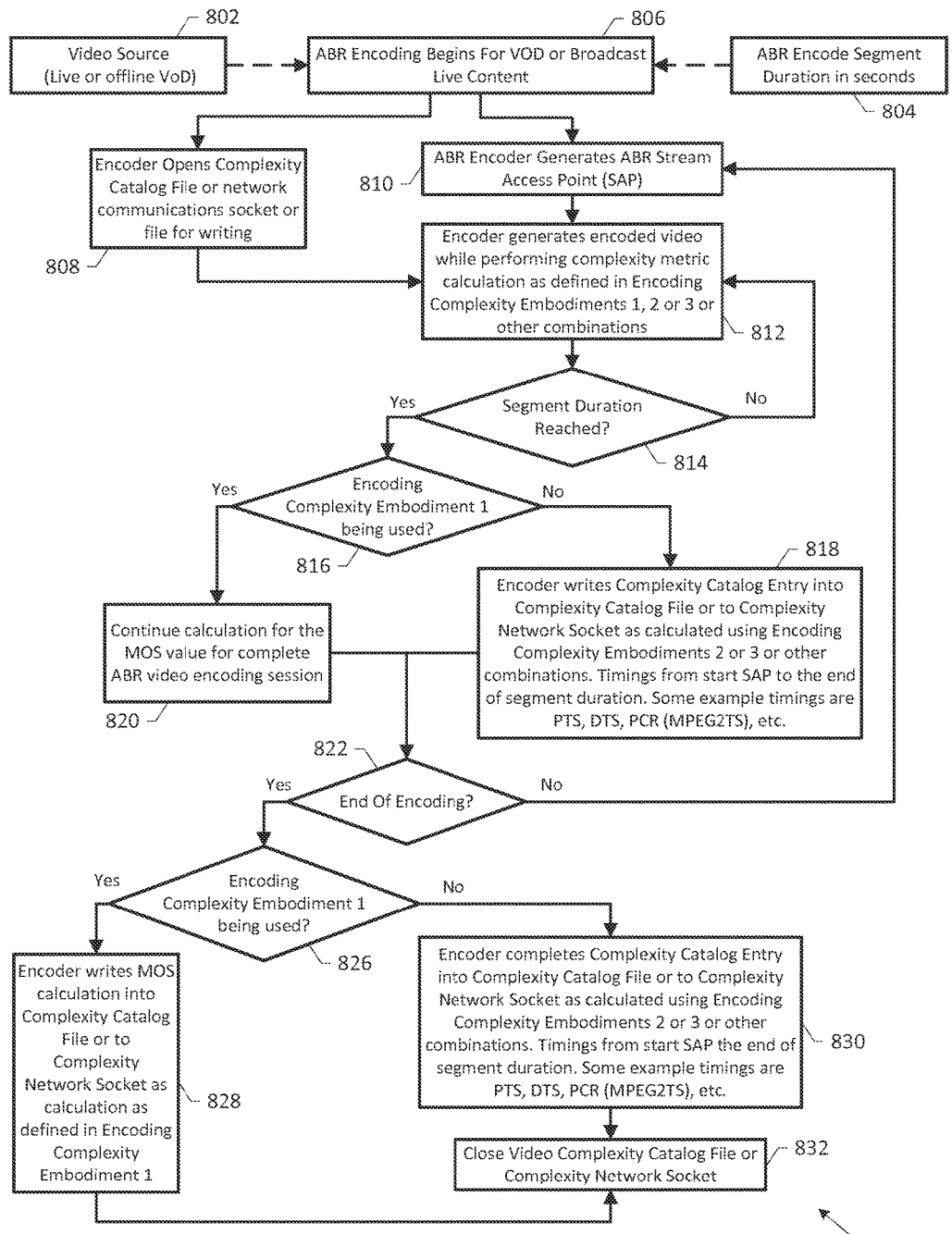
FIG. 8 depicts a flowchart of steps, acts, blocks and/or functions that may take place relative to an illustrative process for generating or otherwise obtaining encoding complexity metrics information during encoding/transcoding of a media asset according to an example embodiment.

FIG. 8 depicts a flowchart of an illustrative process 800 in additional detail for generating or otherwise obtaining ECM information during encoding/transcoding of a media asset according to an example embodiment. At block 806, an encoding/transcoding process is executed with respect to content from a media asset (block 802) depending on information provided regarding configurable segment encoding time durations (block 804). Appropriate timing reference points (e.g., SAPs, etc.) are generated by the encoder (block 810). A complexity catalog file may be created by the encoder or a suitable communications socket/interface may be effectuated for writing the catalog file to a different location (block 808). Also, the encoder generates encoded video streams while performing ECM computations as set forth herein above (block 812), which may continue until the segment encoding duration has been reached (block 814). Depending on whether the first ECM embodiment is being implemented (block 816), MOS value computation or estimation may continue for the entire ABR video encoding session (block 820). Otherwise, the encoder writes complexity catalog information into the catalog file or to the network communications socket, wherein the ECM data is determined according to other embodiments, with appropriate timing intervals being used (block 818). The foregoing steps or actions may continue to take place until it is determined that the encoding/transcoding process has reached completion (block 822). Otherwise, a next timing interval is generated by the encoder (block 810), whereupon appropriate ECM information associated therewith is obtained. Where the first ECM embodiment is being used (block 826), the encoder writes the MOS data obtained for the complete media asset into the complexity catalog file or to the network communications socket (block 828). If other ECM embodiments are being used, the encoder completes writing the complexity catalog information (mapped to appropriate timing intervals) into the catalog file or to the network communications socket (block 830). After writing the ECM and/or MOS information, the encoder closes the catalog file or the network communications socket as the case may be (block 832).

In an embodiment of the present disclosure, complexity-driven segment delivery may be effectuated based on virtualized representation of ABR media segments. Broadly, in this embodiment, a client device requests a segment using its bandwidth calculation and defined bitrates in the manifest. A virtual segmenter system examines the segment requested by the client device. If the requested segment bitrate (also sometimes referred to as "requested bitrate" in some embodiments) is above the bottom of the encoded resolution for the selected bandwidth, a segment delivery processor examines the encoding complexity across lower than the requested segment within the given resolution grouping/class. If a lower bit rate encoded data can be sent without degradation in QoS, then that encoded data from memory will be represented as the client's requested segment. The foregoing scheme is further described in additional detail below in reference to FIGS. 9 and 10.

Figure 9:
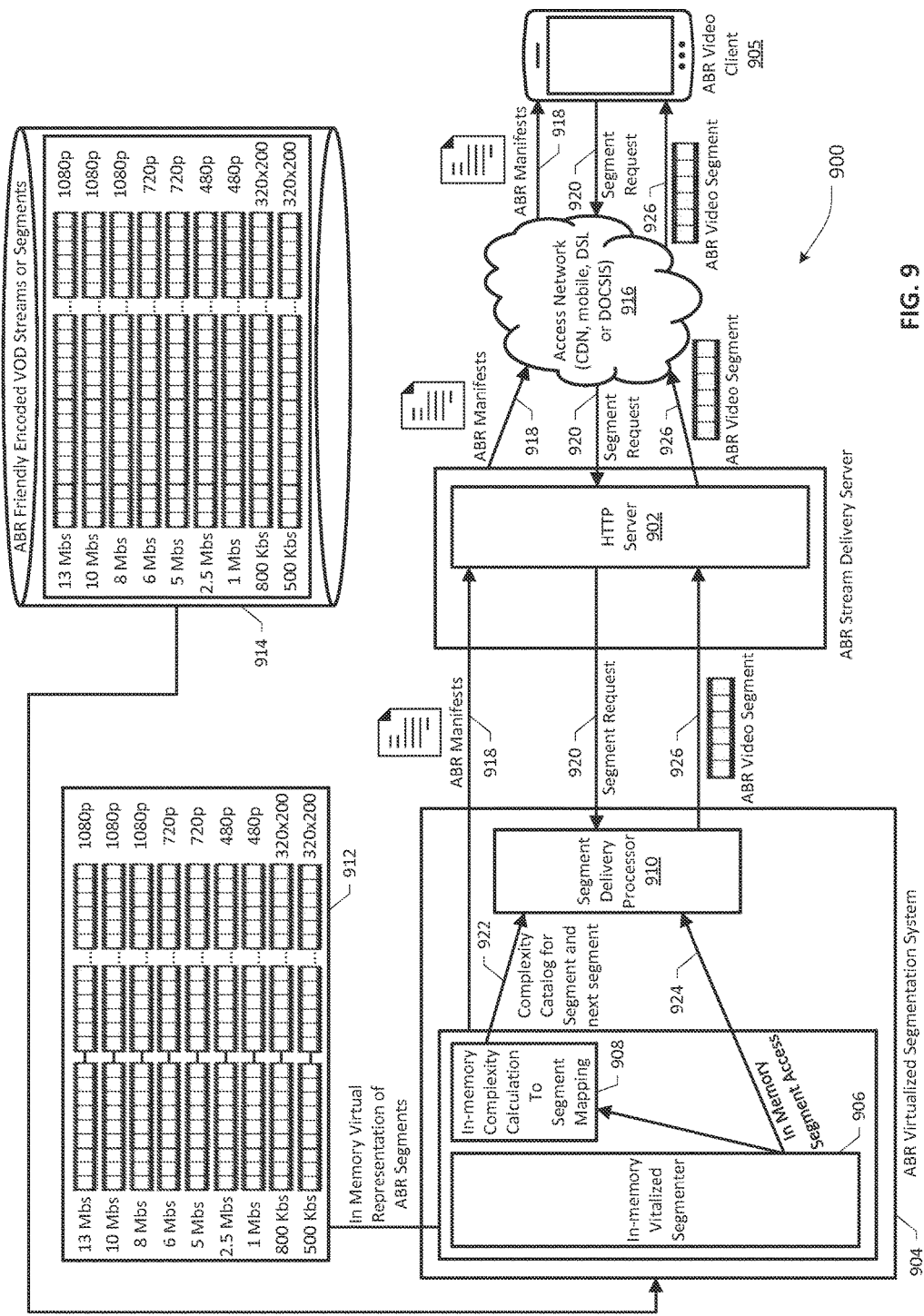
FIG. 9 depicts a block diagram of an example network system or subsystem for effectuating complexity-driven segment delivery in an ABR network utilizing virtualized representation of ABR media segments according to an example embodiment.

FIG. 9 depicts an example ABR network environment 900 for effectuating complexity-driven segment delivery based on virtualized representation of ABR media segments according to one implementation. A dynamic ABR virtualization segmenter system or subsystem 904 is operative in conjunction with a stream delivery server which may be provided at an edge network coupled to an access infrastructure 916 serving the ABR client device 905. The virtualization segmenter system 904 is configured to receive a plurality of ABR friendly encoded segmented media streams from a database storage node 914 in order provide a virtualized representation of content segments in a random access memory (RAM) associated therewith. Reference numeral 912 refers to an illustrative RAM portion having a plurality data structures encompassing pointers that correspond to various time codes (e.g., PTS/DTS and SAP information) as well as references to content streams at bitrates ranging from 500 Kbs to 13.0 Mbs that correspond to various display resolutions. A processing unit 906 of the segmenter subsystem 904 is operative to generate in-memory ECM calculations with respect to the media segments represented in the memory 912 and/or map the received/calculated ECM data to the represented segments in an ECM mapping module 908. The segmenter processor 906 is further operative to provide access 924 to virtualized segments for a segment delivery processor 910, which further interfaces via path 922 with the ECM mapping module 908 for receiving complexity catalog information for a particular number of segments (after appropriately mapped to the virtualized segments).

The in-memory segmenter 906 and associated ECM mapping module 908 are operative to provide suitable manifest(s) including a plurality of references corresponding to a plurality of content stream fragments, which may be provided to an HTTP server 902 configured as the ABR stream delivery server for purposes of effectuating a streaming session with the ABR client device 905, which manifest data is provided via paths 918. The processing unit is further configured to obtain content bytes associated with a requested fragment or segment from the data structures based on a start time and stop time associated with the requested fragment and compute corresponding pointers associated with the plurality of data structures to look up the content byte data. Additional details regarding virtualized segmentation of ABR content streams may be found in commonly owned U.S. Pat. No. 8,762,452, incorporated by reference herein. Because the time code and SAP information of content streams is readily available, segments of different size and/or select bitrates may be constructed, whereby appropriate manifests for the segments may be provided when bitrate throttling may be deemed appropriate. Segment requests from the ABR client device are transmitted via paths 920 and selected media segments are provided via paths 926, as facilitated by the segment delivery processor 910 and ABR stream delivery server 902.

Figure 10A:
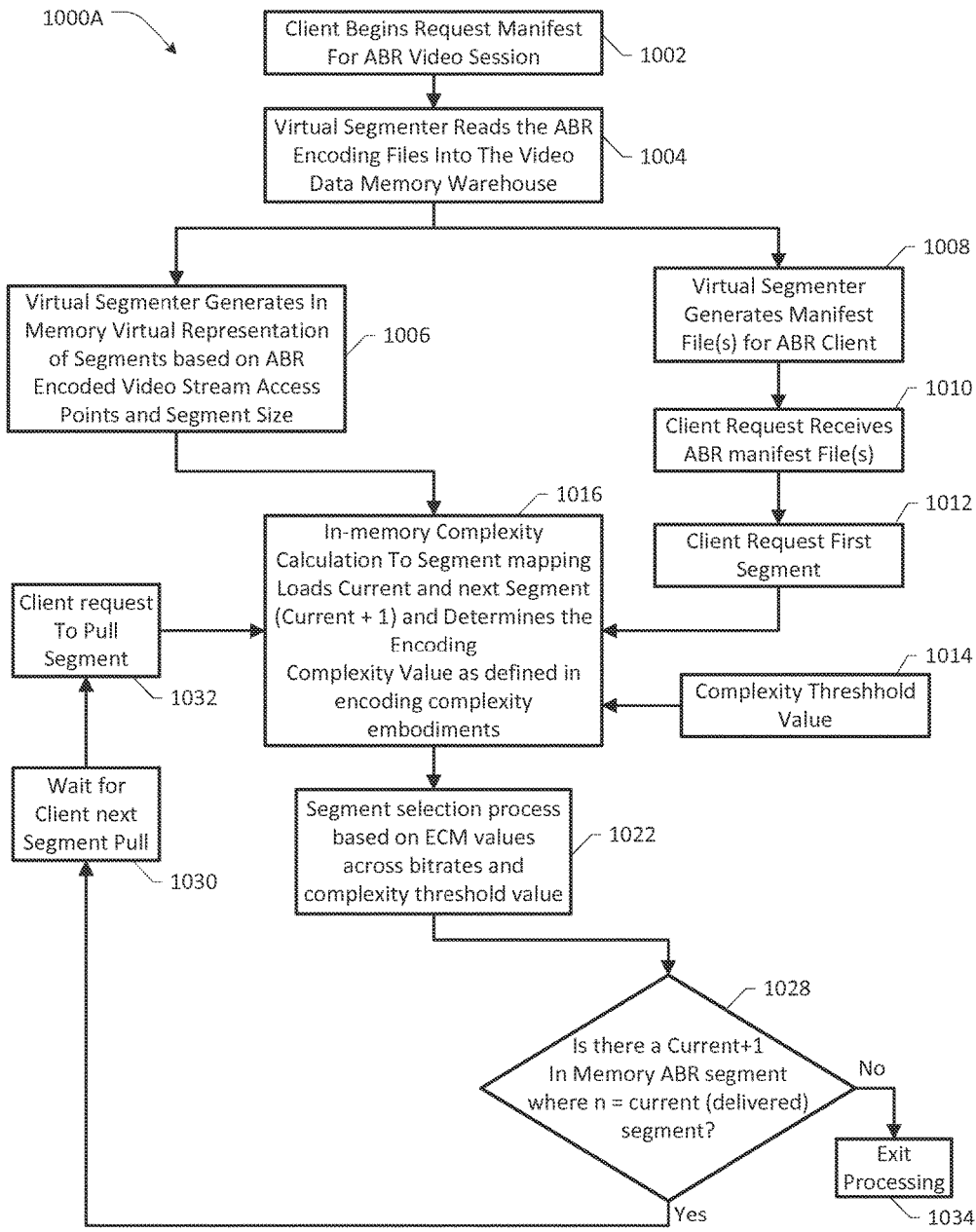
FIGS. 10A and 10B depict flowcharts of various steps, acts, blocks and/or functions that may take place relative to an illustrative process for effectuating complexity-driven segment delivery according to an example embodiment.
Figure 10B:
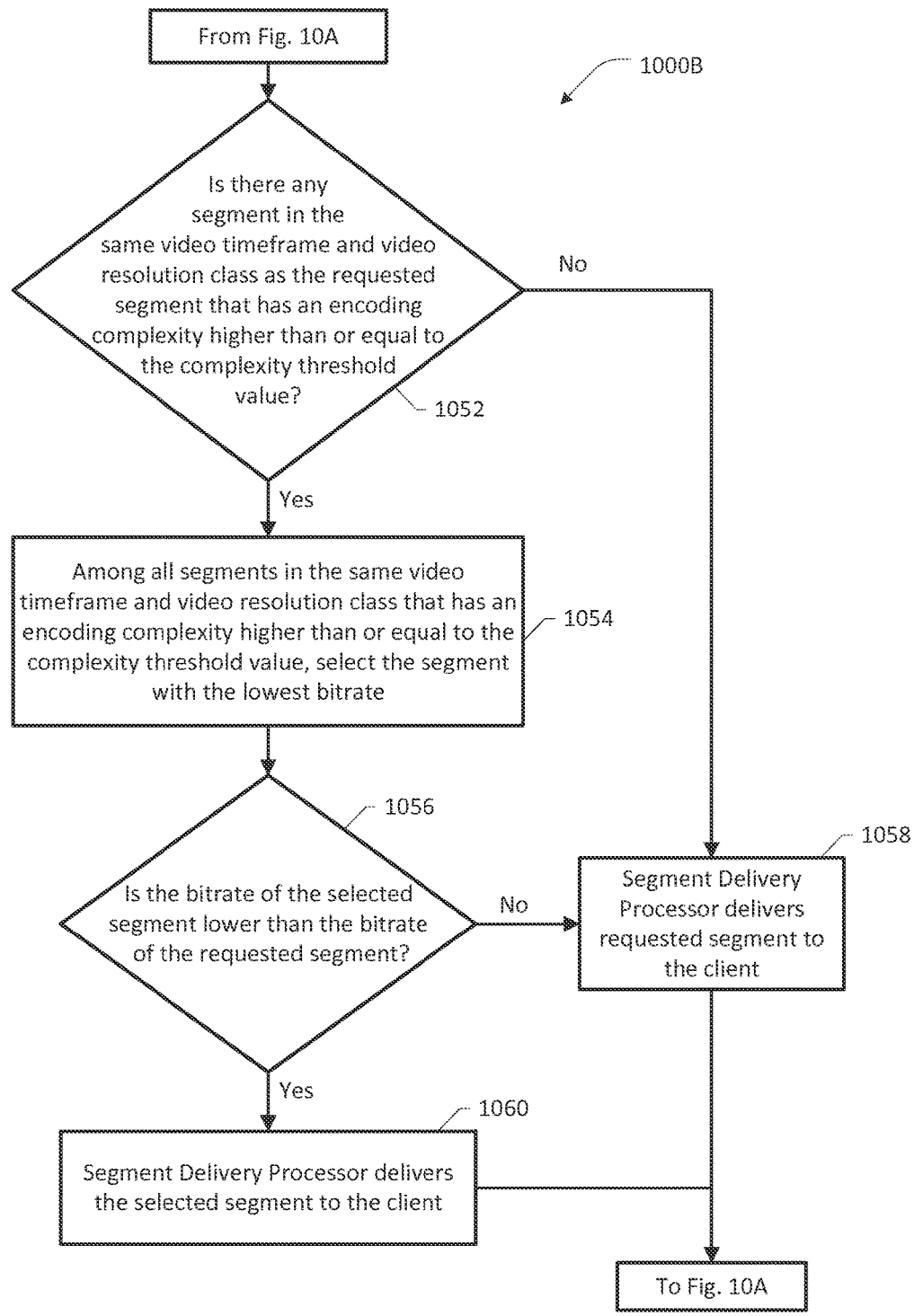

One skilled in the art will appreciate that by removing or deactivating the in-memory virtualized segmentation system 904, the ABR network architecture 900 described above can also be configured in a further embodiment to operate with an ABR stream delivery server for effectuating segment delivery based on ECM information. Turning to FIGS. 10A and 10B, depicted therein are various steps, acts, blocks and/or functions that may take place relative to an illustrative process for effectuating complexity-driven segment delivery. Reference numeral 1000A in FIG. 10A refers to an overall process, while reference numeral 1000B in FIG. 10B refers to an example implementation of a portion or block of the overall process 1000A according to an embodiment. Whereas the process 1000A may be implemented in an arrangement that includes virtualized segmentation as set forth in FIG. 9, a subset or sub-combination of the process 1000A, including the process 1000B, may be applied or configured to operate in an arrangement that does not include virtualized segmentation. At block 1002, the ABR client device requests manifest data with respect to an ABR streaming session. A virtual segmenter system reads the ABR encoding files into a memory warehouse (block 1004) and generates in-memory representation of the segments based on SAP information and segment size information (block 1006). The virtual segmenter system also generates appropriate manifest file(s) for the requesting ABR client (block 1008), which receives the manifest data (block 1010) and requests a segment responsive thereto (block 1012). In-memory ECM calculations (e.g., estimated MOS values as set forth above) may be performed with respect to a select number for media segments, e.g., a currently requested segment and the following segment, for mapping to the received/calculated ECM data (block 1016). Appropriate complexity threshold information (e.g., MOS threshold values) may be provided (block 1014) for facilitating ECM-based decision-making, e.g., by way of policy-based management, involving a segment selection process (block 1022) that may be repeated in an iterative manner. If there are no additional segments to be delivered (block 1028), the process 1000A is exited (block 1034). Otherwise, the process waits for the next segment pull request from the client, as shown at blocks 1030 and 1032, whereupon the in-memory ECM calculation/mapping operation continues again (block 1016).

Referring to FIG. 10B, an example implementation of ECM-based decision-making process 1000B with respect to segment selection is illustrated therein, which is an embodiment of block 1022 set forth in FIG. 10A. Broadly, the objective of this process flow is to select a lowest bitrate segment in a specified video resolution class yet achieve a particular level of quality. For purposes of the present disclosure, a video resolution grouping or class is a set of encoding bitrates represented in an ABR manifest which belong to the same resolution class (e.g., BR(i) to BR(i+k) corresponding to 1080p resolution as shown in FIG. 9). At block 1052, a determination is made with respect to whether there is any segment in the same video timeframe and video resolution class as the requested segment that has an encoding complexity higher or equal to the complexity threshold value. If none (i.e., quality suffers even at top bitrate), the segment delivery processor delivers the requested segment to the client device (block 1058). Otherwise, by taking the YES path from block 1052, a selection may be made among all segments in the same video timeframe and video resolution class that has an encoding complexity higher or equal to the complexity threshold value, to select the segment with the lowest bitrate (block 1054). A further determination may be made as to whether the bitrate of the selected segment is lower than the bitrate of the requested segment (block 1056). If not (i.e., the client is bandwidth-bound and therefore the quality cannot be improved), the flow proceeds to block 1058 wherein the segment delivery processor delivers the requested segment to the client device. Otherwise, by taking the YES path from bock 1056 (i.e., a target segment has been identified for delivery), the segment delivery processor delivers the selected segment to the client device (block 1060). As noted above, if there are no additional segments, the overall process flow is terminated, as set forth in FIG. 10A.

Because there is no need for in-memory ECM calculations or mapping in an arrangement that does not involve virtual segmentation, an ABR stream delivery system in such a configuration may use the received ECM data and manifest information directly to facilitate the segment delivery within the framework set forth above, suitably modified, e.g., instead of in-memory ECM mapping, the client may use the ECM data received via, e.g., the manifest files (block 1010). Accordingly, a processing entity of the ABR stream delivery server may be configured to execute a sub-combination of the foregoing operations responsive to a download request: parsing received ECM information associated with one or more ABR representations of a media asset wherein the one or more ABR representations each comprise a stream of segmented content of the media asset encoded at a particular bitrate; responsive to a segment download request from an ABR client device, determining a set of video encoding bitrates identified within a manifest provided to the ABR client device for facilitating streaming of the media asset, wherein the set of video encoding bitrates consist of bitrates of segments belonging to a same video resolution class that the ABR client device has settled on for streaming the media asset; performing a segment selection process based on evaluating received ECM values across segment bitrates of the same video resolution class against a complexity threshold value and selecting a lowest-bitrate-encoded segment having an ECM value equal to or exceeding the complexity threshold value; and delivering the selected segment to the ABR client device.

Figure 11:
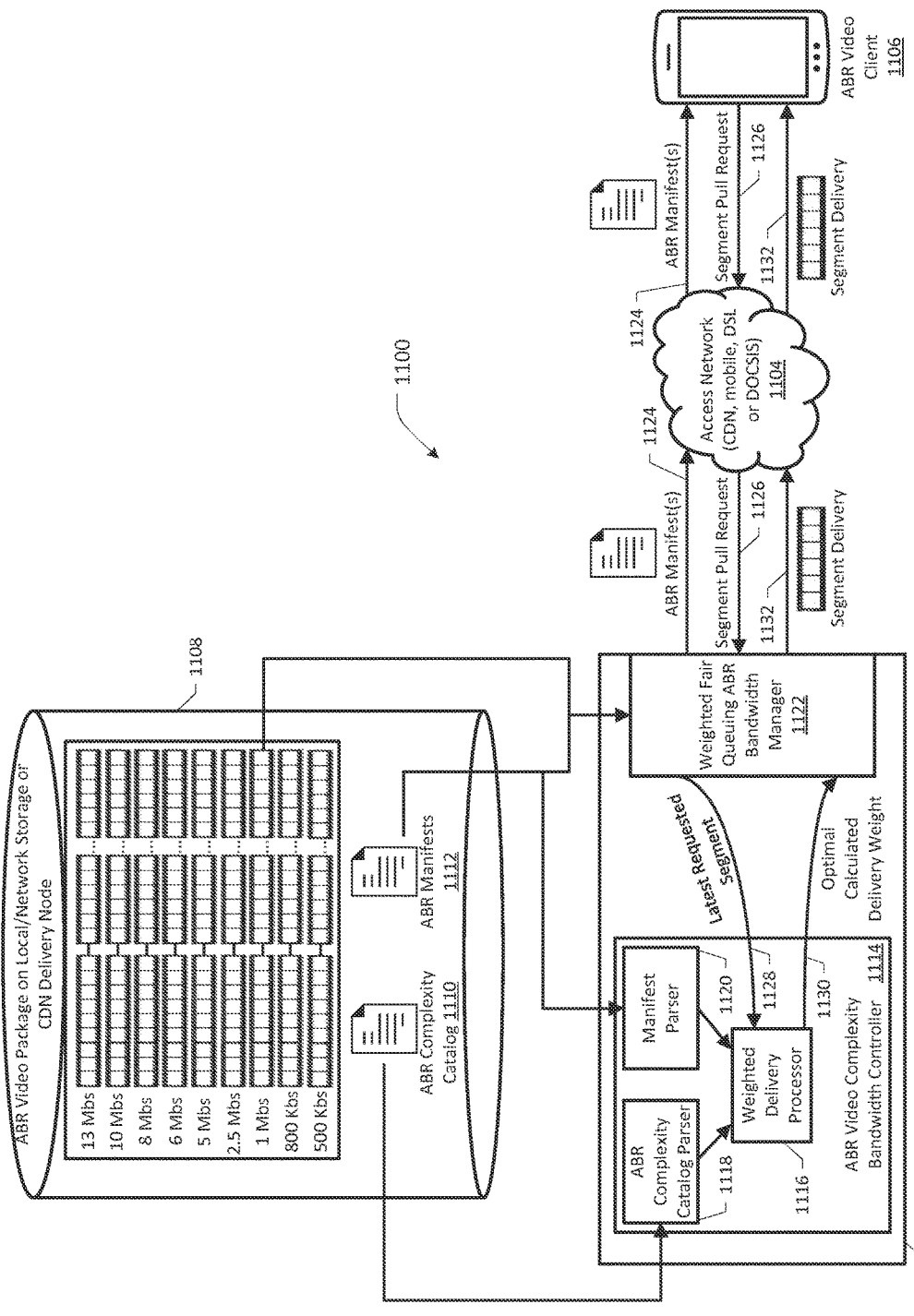
FIG. 11 depicts a block diagram of an example network architecture or effectuating bandwidth management in a weighted fair queuing scheme based on ECM information according to an embodiment.

FIG. 11 depicts an example ABR network environment 1100 for effectuating bandwidth management using a WFQ-based scheduling scheme based on ECM information according to an example embodiment. Preferably, an example bandwidth-controlled stream delivery system 1102 is disposed at an edge network in association with an access network infrastructure 1104 that serves one or more ABR client devices, e.g., UE 1106. Similar to certain embodiments set forth hereinabove, the BW-controlled delivery subsystem 1102 may be configured to facilitate streaming of media asset packages provided in suitable database(s) 1108 disposed as local or network storage or in association with a CDN origin server, wherein the database(s) 1108 may include ABR complexity catalogs 1110 and manifest(s) 1112 with respect to the stored media segments in multiple representations/resolutions. A bandwidth controller 1114 of the stream delivery subsystem 1102 may include a weighted delivery processor 1116 operating in conjunction with a complexity catalog parser 1118 and manifest parser 1120 for facilitating appropriate service logic with respect to modifying bandwidth weights, factors, priorities, etc. that may be used in a bandwidth management block 1122 according to any known or heretofore unknown WFQing or other bandwidth management techniques. Additional details regarding example bandwidth management, scheduling and/or allocation schemes that may be utilized in conjunction with embodiments set forth in the present patent disclosure may be found in following commonly owned U.S. patent(s) and/or U.S. patent application publication(s): (i) "BANDWIDTH MANAGEMENT FOR OVER-THE-TOP ADAPTIVE STREAMING" (Ericsson Ref. No.: P39592-US1), application Ser. No. 13/845,320, filed Mar. 18, 2013, in the name(s) of Charles Dasher et al., published as U.S. Patent Application Publ. No. 2014/0280764; (ii) "REGULATING CONTENT STREAMS FROM A WEIGHTED FAIR QUEUING SCHEDULER USING WEIGHTS DEFINED FOR USER EQUIPMENT NODES" (Ericsson Ref. No.: P37772-US1), application Ser. No. 13/597,333, filed Aug. 29, 2012, in the name(s) of Charles Dasher et al., published as U.S. Patent Application Publ. No. 2014/0068076; (iii) "METHODS AND APPARATUS FOR MANAGING NETWORK RESOURCES USED BY MULTIMEDIA STREAMS IN A VIRTUAL PIPE" (Ericsson Ref. No.: P36357-US1), application Ser. No. 13/403,075, filed Feb. 23, 2012, in the name(s) of Bob Forsman et al., now issued as U.S. Pat. No. 8,549,570; and (iv) "METHODS, APPARATUS, AND COMPUTER PROGRAM PRODUCTS FOR ALLOCATING BANDWIDTH FOR PUSH AND PULL CONTENT REQUESTS IN A CONTENT DELIVERY NETWORK" (Ericsson Ref. No.: P39663-US1), application Ser. No. 13/856,895, filed Apr. 4, 2013, in the name(s) of Christopher Phillips et al., published as U.S. Patent Application Publ. No. 2014/0304372, each of the foregoing patent(s) and/or publication(s) being incorporated by reference herein.

Continuing to refer to FIG. 11, ABR manifest data may be provided to the requesting ABR client 1106 via network communication paths 1124. Responsive thereto, segment download request(s) from ABR client device 1106 may be propagated via network communication paths 1126. In accordance with the teachings herein, the bandwidth manager block 1122 is operative to interface with the delivery processor 1116 with respect to the requested segments 1128 and obtaining optimal calculated delivery weights 1130 for effectuating bandwidth-controlled segment delivery via network communication paths 1132 to the ABR client 1106. It should be realized that in a further embodiment, the stream delivery server 1102 may be coupled to a dynamic virtual segmentation system (e.g., ABR virtualized segmentation system 904 described hereinabove in reference to FIG. 9), wherein processes similar to the flow of FIG. 10A may be combined in a bandwidth management process for purposes of the present patent application.

Figure 12:
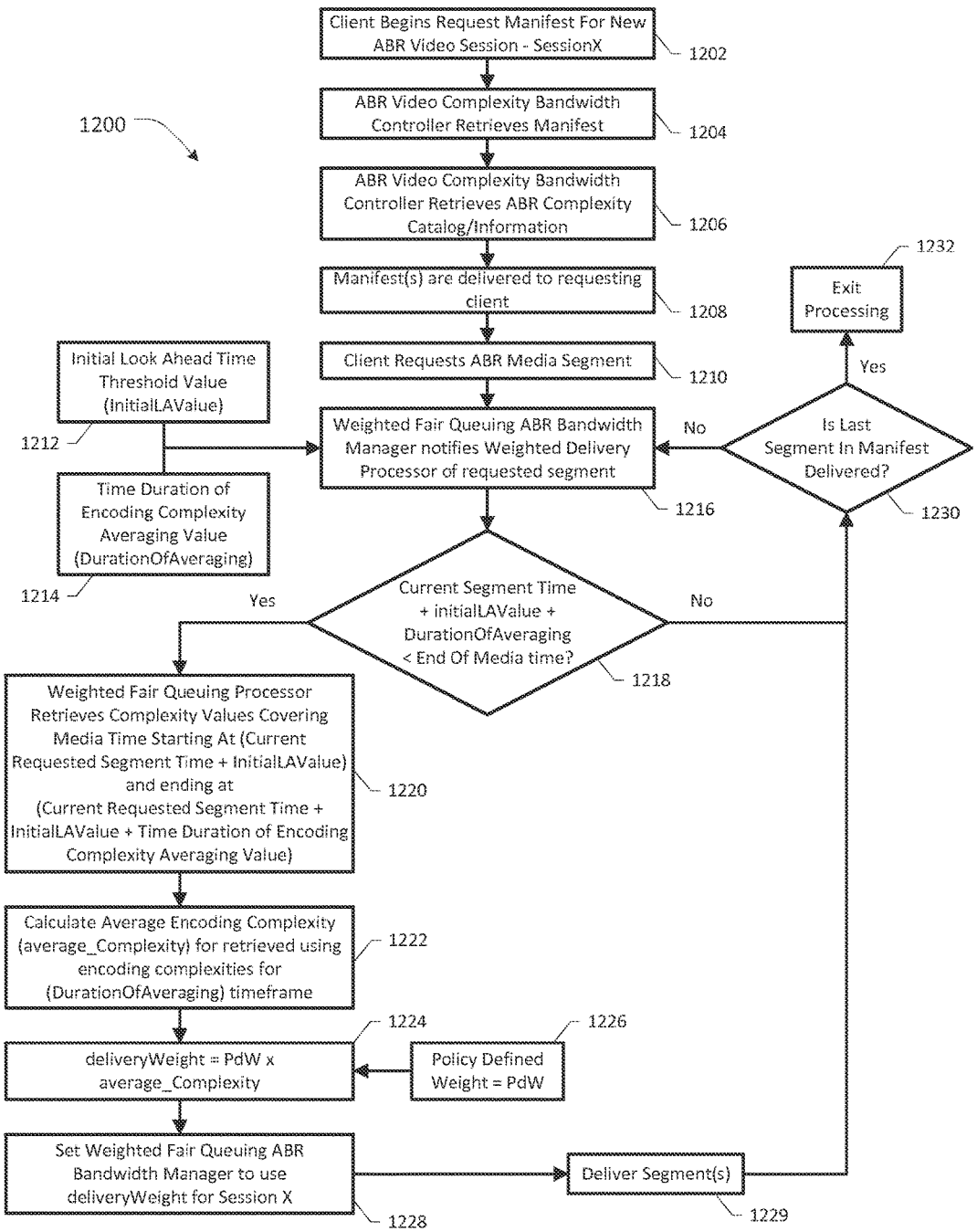
FIG. 12 depicts a flowchart of various steps, acts, blocks and/or functions that may take place relative to a complexity-driven bandwidth management or allocation according to an example embodiment.

FIG. 12 depicts a flowchart of a complexity-driven bandwidth management or allocation process 1200 in additional detail according to an example embodiment. At block 1202, an ABR client device begins a request for manifests relative to a streaming video session. Responsive thereto, a complexity-driven bandwidth controller is operative to retrieve appropriate manifest data and complexity catalog information (blocks 1204, 1206). Upon receiving the manifest data (block 1208), the ABR client requests suitable media segment(s) (block 1210), which may be notified by a bandwidth manager to a delivery processor associated with the bandwidth controller as set forth at block 1216. The bandwidth controller is further operative to receive dynamically configurable control inputs (block 1212) regarding initial "Look Ahead" (LA) threshold values, e.g., 5 minutes, as well as time durations over which the received ECM information may be averaged, designated herein as "DurationofAveraging" values) (block 1214). A "summation time" comprising a current segment time added to the initial LA threshold value which is further added to a select time duration (i.e., DurationofAveraging value over which the received ECM information is averaged) is compared against an end of media time associated with the media asset (block 1218). If not, a determination as to whether a last segment of the media asset identified in the manifest is delivered (block 1230). If so, the complexity-driven bandwidth allocation process 1200 terminates (block 1232). Otherwise, the process 1200 continues as set forth below.

It will be appreciated that in one example implementation, the foregoing iterative loop may be operative to ensure that complexity-driven bandwidth allocation may cease before a time period (e.g., the summation time) prior to the last segment is delivered. Until that time is reached, the process may continue to be executed in order to modify priority weights used in a WFQ scheme. Upon determining that the current summation time is less than the end of media time (as set forth in block 1218), an average ECM value for media content over the select time duration is determined (blocks 1220, 1222). Thereafter, a delivery weight parameter may be computed as a function or factor of the average ECM value and a preconfigured weight to be used in the WFQ process for delivering the media content to the ABR client device (blocks 1224, 1226). One skilled in the art will recognize that the preconfigured weights may be defined by way of policy management (e.g., operator policies, content provider policies, etc.) as set forth in one or more commonly owned U.S. patent(s) and/or U.S. patent application publication(s) incorporated by reference hereinabove. Subsequently, the calculated delivery weight parameter is provided to the bandwidth manager for applying it in a WFQ-based scheduling process with respect to streaming the media asset to the ABR client device until all media segments are delivered (blocks 1228, 1229, 1230).

Figure 13:
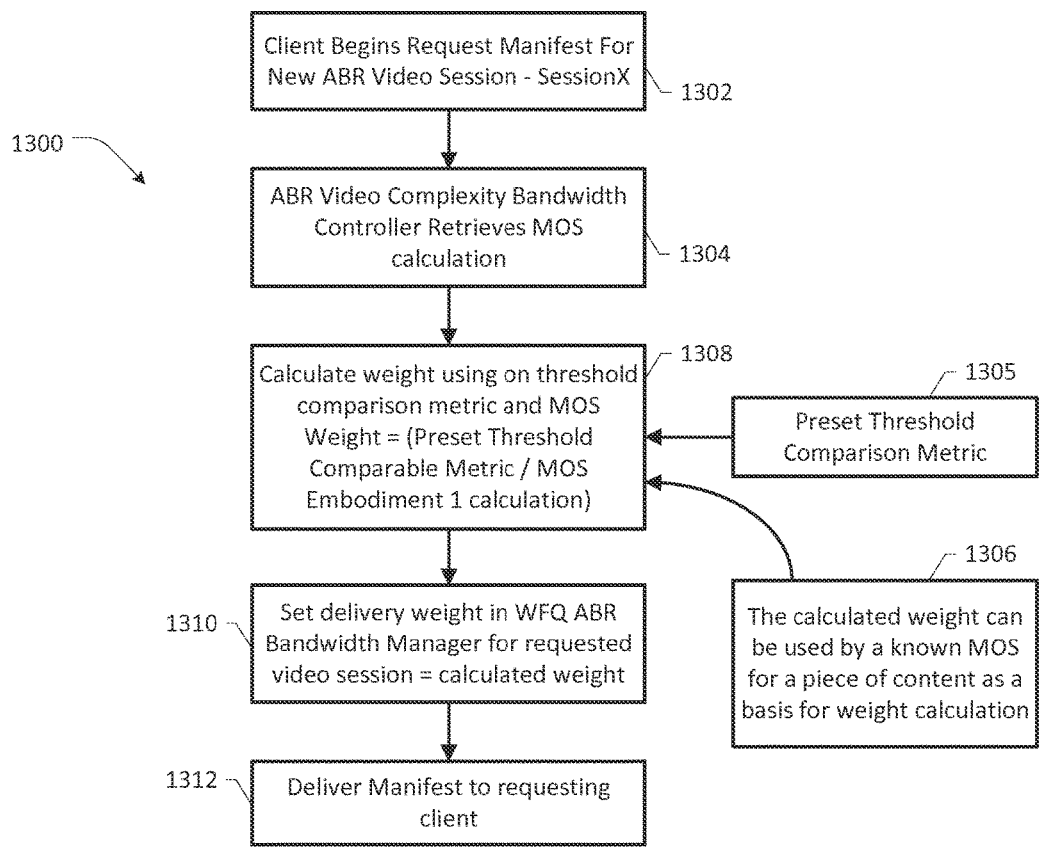
FIG. 13 depicts a flowchart of various steps, acts, blocks and/or functions that may take place relative to a complexity-driven bandwidth management or allocation according to another example embodiment.

As the Look Ahead information is usually not available with respect to real-time live media assets, another implementation of a complexity-driven bandwidth management scheme 1300 may employ the first ECM embodiment (e.g., MOS values determined over an entire section of the media) according to the teachings herein, exemplified in FIG. 13. As before, an ABR client device begins a request for manifests relative to a new video session, e.g., SessionX (block 1302). Responsive thereto, a complexity-driven bandwidth controller is operative to retrieve MOS information for the requested media (block 1304). A weight may be calculated using a preconfigured comparison metric (block 1305) and a given MOS value for a piece of content as set forth at blocks 1306 and 1308. A bandwidth manager is provided the calculated weight to be used as a delivery weight for the requested session (block 1310). The requesting ABR client is provided with the manifest (block 1312), whereupon subsequent segment downloads are managed by the bandwidth manager node using the calculated delivery weights in effectuating appropriate WFQ-based scheduling schemes.

In a further embodiment of the present disclosure, a combination of segment-by-segment delivery as well as complexity-driven bandwidth management may be advantageously implemented to achieve better quality and overall bandwidth optimization. Broadly, in such a configuration, the segments may be examined at delivery time to determine an optimal segment to deliver across a resolution grouping/class that the client has settled in. A bandwidth management scheme adjusts the bandwidth based on the ECM information along with other policies for the defined timeframe in the video session. The bandwidth management may force the client to settle into a download of segments based on the allocated bandwidth at a given point in time. Various bandwidth throttling and management techniques such as those described in one or more commonly owned U.S. patent applications and/or U.S. patents referenced hereinabove may be employed in this regard. It should be appreciated that whereas a bandwidth management-only implementation may operate over a broader time scale in adjusting bandwidth, it cannot, however, fine-tune the delivery of the segments from segment to segment. By combining both features, one can control the bandwidth for a given client over the broader time, forcing the client to settle on downloading the client determined segment in a resolution class based on the allocated bandwidth. Thereafter, with controlling the segment delivery, finer granularity in tuning can provide the most optimal combination of bandwidth management and QoS throughout the video session.

Figure 14A:
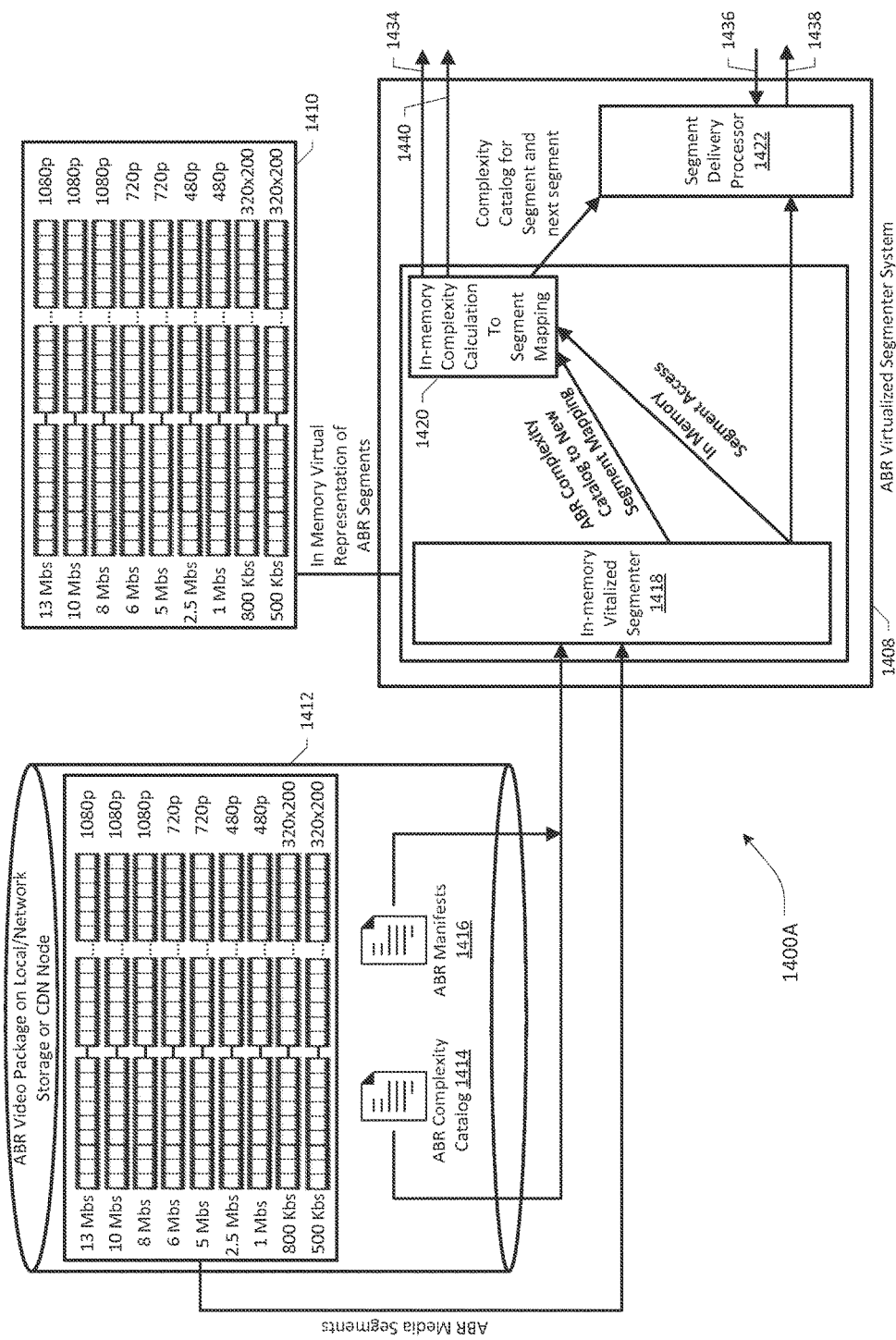
FIGS. 14A and 14B depict a block diagram of an example network system or subsystem that utilizes complexity-driven segment delivery and bandwidth management in an ABR network that includes virtualized representation of ABR media segments according to an embodiment.
Figure 14B:
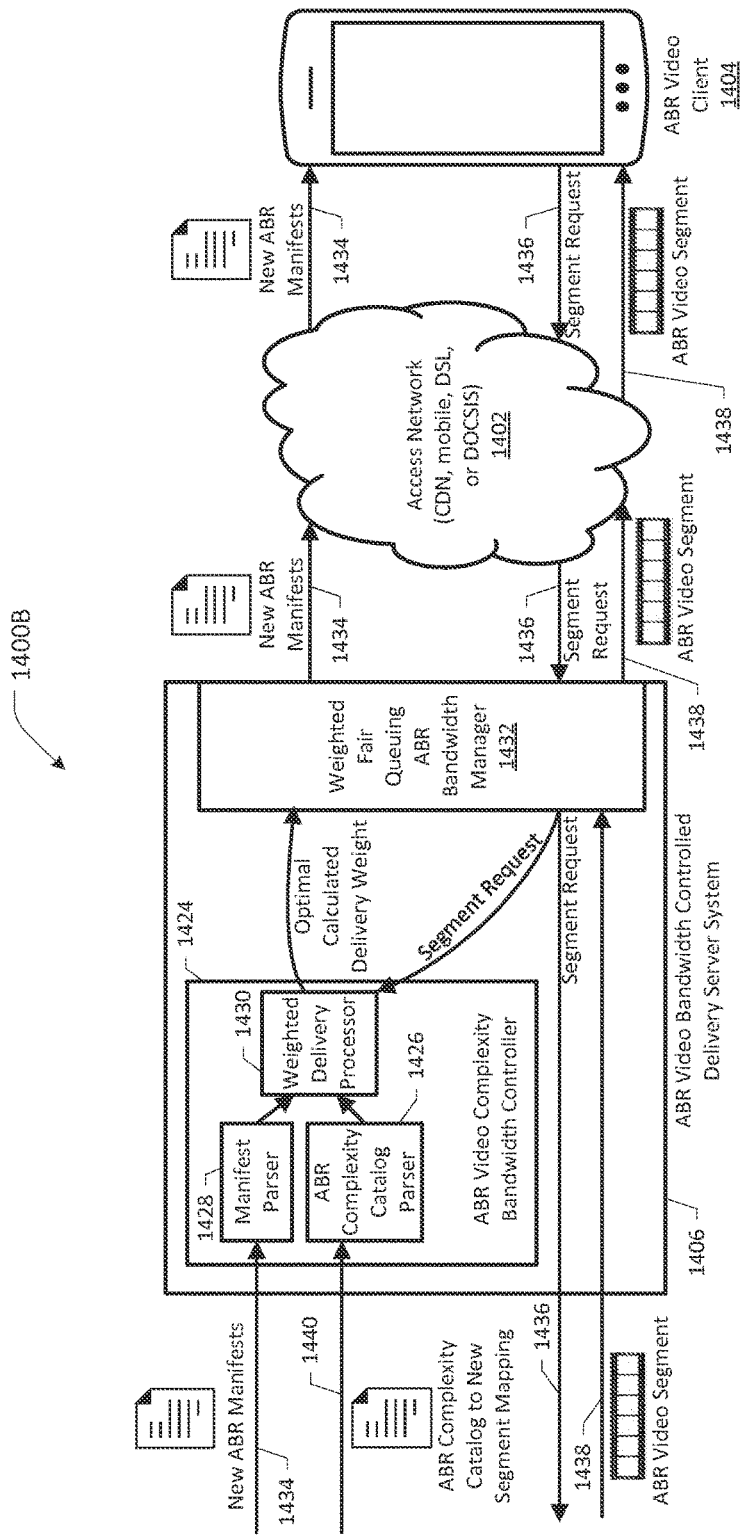

Taking reference to FIGS. 14A and 14B together, depicted therein is an example ABR network environment partitioned into portions 1400A and 1400B, respectively, that utilizes complexity-driven segment delivery and bandwidth management in an implementation including virtualized representation of ABR media segments. Those skilled in the art will recognize that the network environment 1400A/1400B is largely a combination of the networks 900 and 1100 of FIGS. 9 and 11, respectively, described hereinabove, although it is not necessary to include virtual segmentation for combining both segment delivery and bandwidth management in practice of an example implementation. Accordingly, only certain relevant components are described below, under the notion that the description of FIGS. 9 and 11 is equally applicable here with suitable modifications.

As before, an ABR virtualized segmentation subsystem 1408 includes an in-memory virtualized segmenter/processor 1418 interfaced with an ECM-to-segment mapping module 1420 and a segment delivery processor 1422. Likewise, a bandwidth-controlled stream delivery system 1406 is disposed at an edge network in association with an access network infrastructure 1402 serving one or more ABR client devices, e.g., UE 1404. Rather than coupling to an ABR media asset package database, the bandwidth-controlled stream delivery system 1406 is coupled to the virtualized segmenter system 1408 in this embodiment, which is operative to receive media segments, ABR complexity catalogs 1414 and manifest(s) 1416 from suitable database(s) 1412 disposed as local or network storage or in association with a CDN origin server. In-memory representation of virtualized segments at different bitrates for multiple resolution classes is effectuated via memory 1410. Similar to the arrangement shown in FIG. 11, a bandwidth controller 1424 of the stream delivery subsystem 1406 may include a weighted delivery processor 1430 operating in conjunction with a complexity catalog parser 1426 and manifest parser 1428, for providing optimal calculated delivery weights to a WFQ-based bandwidth manager 1432. New ABR manifests 1434 and complexity catalog information containing mappings 1440 to the new segments are provided to the manifest parser 1428 from the virtualized segmenter system 1408, which new ABR manifests are transmitted to the ABR client 1404 via suitable network communications paths 1434 as described previously. Segment requests are propagated via paths 1436 to the segment delivery processor 1422 of the virtualized segmenter system 1408, which provides the selected segments to the bandwidth-controlled stream delivery server 1406 for transmission to the ABR client device 1404 via paths 1438.

It will be apparent to one skilled in the art that an example process flow including both segment delivery and bandwidth management based on ECM data may be obtained by combining the processes 1000 and 1200 shown in FIGS. 10 and 12, respectively. Further, where no virtual segmentation is implemented, the process flow of FIG. 10 may be suitably modified as already noted.

Figure 15A:
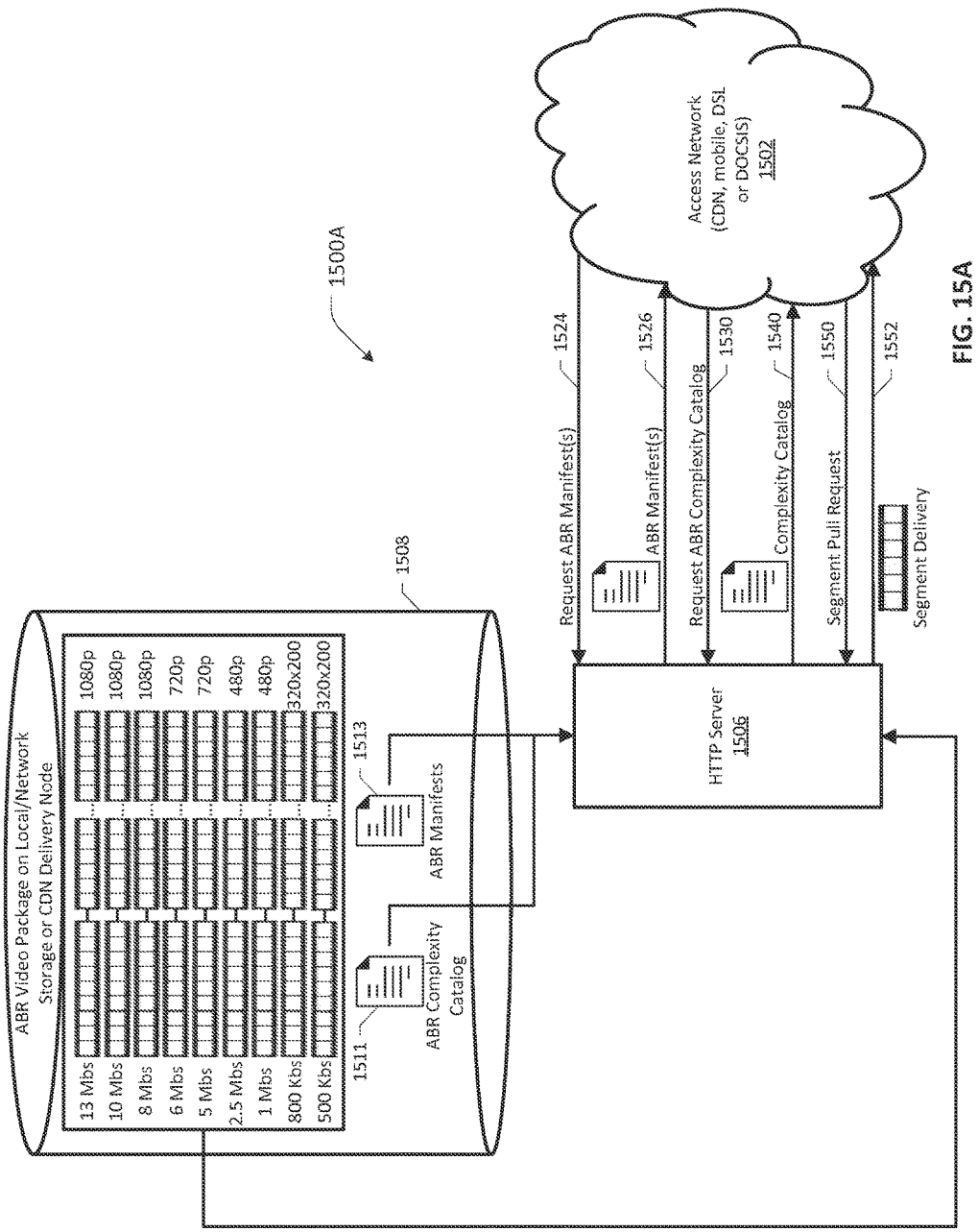
FIGS. 15A and 15B depict an example network architecture wherein an ABR client device is operative to utilize ECM information in modulating its request behavior according to an embodiment.
Figure 15B:
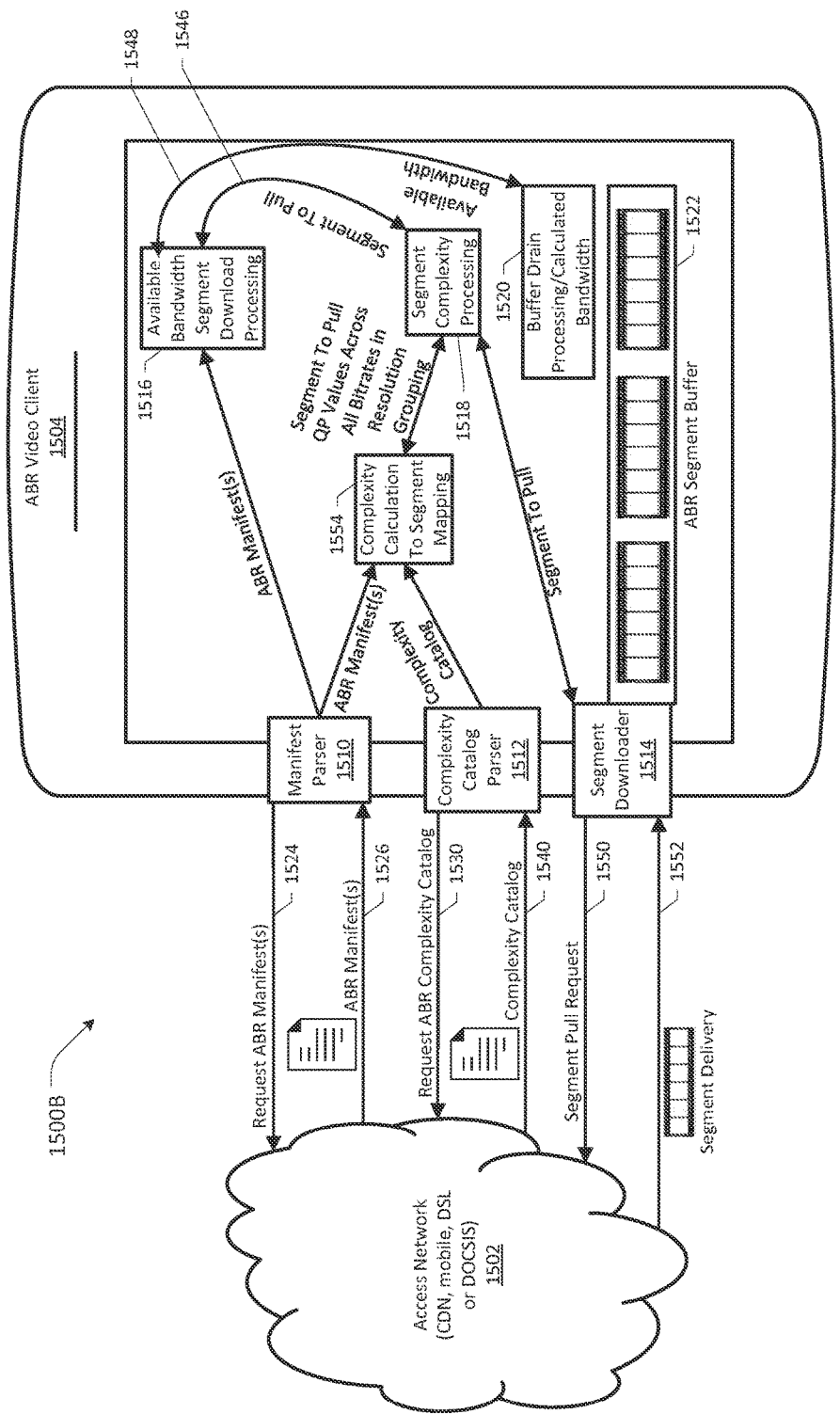

FIGS. 15A and 15B depict an example ABR network environment 1500A, 1500B wherein an ABR client device 1504 is operative to utilize ECM information in modulating its media request behavior according to an example embodiment. Broadly, an embodiment operating within the network environment 1500A/1500B involves processing of the ECM data in a client implementation only (e.g., no ECM-based segment delivery is needed at an upstream node such as a stream delivery server network node). In this embodiment, the client downloads the manifest, downloads the complexity catalog and begins downloading segments. In one implementation, client-driven bandwidth management relative to which next segment to download may be done in a conventional manner. Regardless of how that is implemented, the present embodiment provides further capability and functionality with respect to incorporating segment complexity in modulating the segment requests. For instance, the client may determine the segment to download based on its current bandwidth calculation. The segment to download is passed into segment complexity processing, which examines the qualities for that segment within its given resolution class/grouping. If the segment is not the lowest bitrate segment in the resolution class grouping, then the segment complexity processing examines the ECM data across all the lower bitrates in the given resolution class. If a lower bitrate can be downloaded with no or insignificant quality degradation, then the lower bitrate segment will be requested.

Skilled artisans will recognize upon reference hereto that the ABR client device 1504 disposed in the network environment 1500A/1500B is an additional/alternative embodiment of any of UE devices 114-1 to 114-N (in FIG. 1) or UE device 224 (in FIG. 2), illustrating further modules, blocks and components for purposes herein. Network portion 1500A is similar to certain network embodiments set forth hereinabove, wherein an HTTP server 1506 is configured as an ABR stream delivery server operative to interface with a database 1508 including ABR complexity catalogs 1511 and manifest(s) 1513 with respect to the stored media segments in multiple representations/resolutions. ABR client device 1504 is provided with appropriate network interfaces (not specifically shown) for communicating with the HTTP server 1506 via access network infrastructure 1502 with respect to requesting ABR manifest data 1524, receiving manifest data 1526, requesting ECM catalog data 1530, receiving ECM catalog data 1540, requesting segment pulls 1550 and receiving segments 1552 by means of suitable modules or components. In one configuration, a manifest parser 1510 is provided with the ABR client 1504 for effectuating request/receipt of ABR manifests. Likewise, a catalog parser 1512 and a segment downloader 1514 may be provided for effectuating ECM request/receipts and segment pull requests and delivery, respectively. An ECM to segment mapping module 1554 is interfaced with a segment complexity processing module 1518 responsive to ABR manifest data and ECM data, for determining segments to pull at applicable bitrates in a specific resolution grouping. A segment download processing module 1516 is interfaced with the segment complexity processing module 1518 and a buffer processing module 1520 operative with respect to the client's ABR buffer 1522. Responsive to available bandwidth determinations relative to the ABR buffer 1522 and segment complexity processing 1518, a particular segment identified in the manifest may be selected for downloading.

Figure 16:
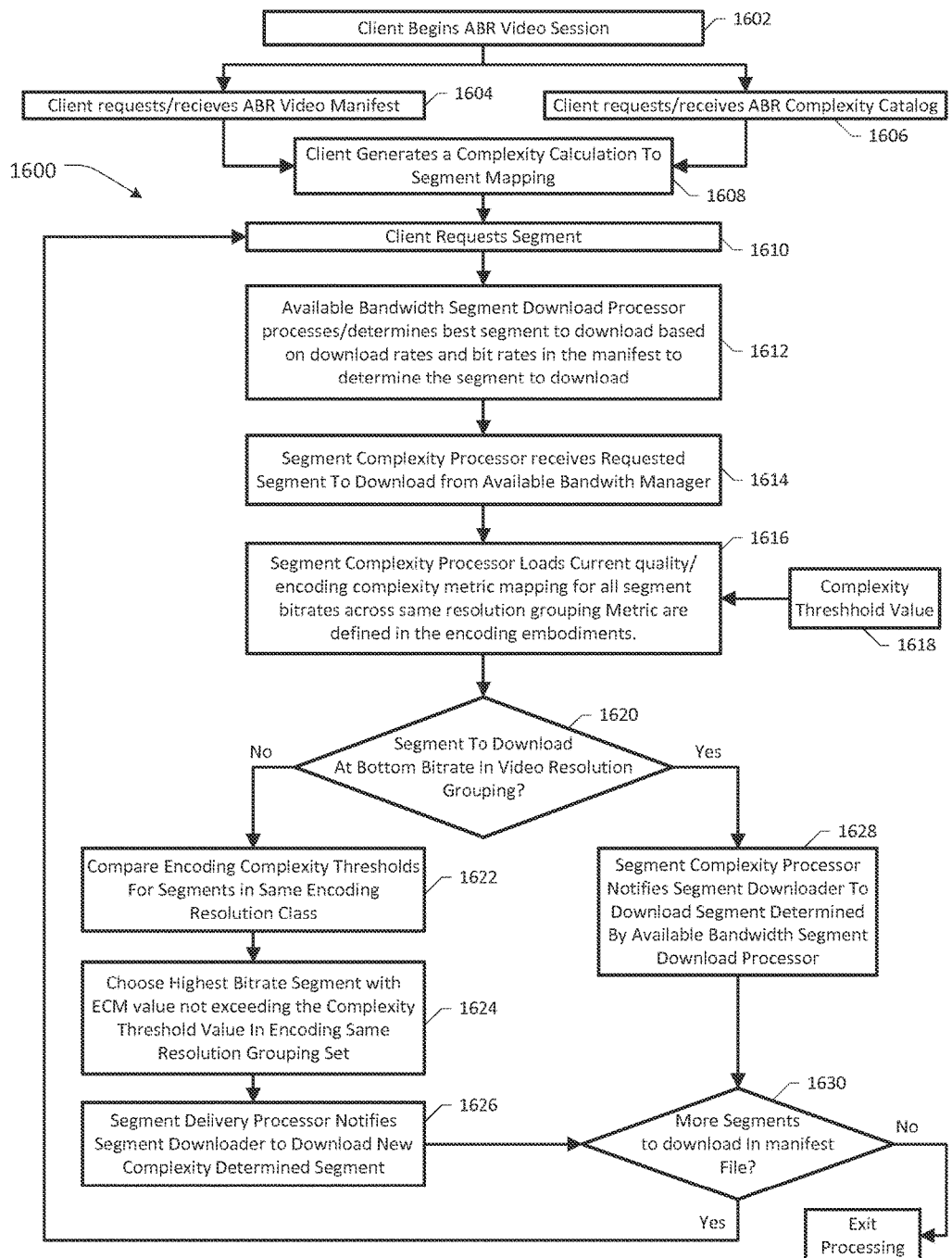
FIG. 16 depicts a flowchart of various steps, acts, blocks and/or functions that may take place relative to an illustrative process for effectuating client-driven segment downloading based on ECM information according to an example embodiment.

FIG. 16 depicts a flowchart of an illustrative client-driven ECM-based segment downloading process 1600 in additional detail that may take place according to an example embodiment. At block 1602, an ABR client commences a media streaming session, pursuant to which requests for ABR manifest(s) and complexity catalog(s) may be generated and transmitted, resulting in receipt of ABR manifest(s) and complexity catalog(s) (blocks 1604, 1606). An ECM to segment mapping may be generated based on the received manifest information (block 1608). When a request for segment(s) is generated in the client device (block 1610), a determination is made regarding an optimal segment to pull depending upon download rates and bitrates identified in the manifest (block 1612). A segment complexity processing module receives the requested segment (block 1614) and performs comparison operations for all segment bitrates across a same resolution class responsive to preconfigured complexity threshold values, which operations are set forth at blocks 1616, 1618. As noted previously, a video resolution grouping is a set of encoding bitrates represented in an ABR manifest which belong to the same resolution class (e.g., BR(i) to BR(i+k) corresponding to 1080P resolution as shown in FIG. 15A). If the requested segment is encoded at a bottom bitrate in a video resolution grouping (block 1620), the segment complexity processor notifies a segment download module to download that segment (block 1628). Otherwise, encoding complexity threshold values for segments in the same resolution class are compared (block 1622). A segment that is encoded at the highest bitrate and having an ECM value not exceeding the predetermined complexity threshold in the same resolution class is then selected (block 1624), which is notified by the segment delivery processor to the segment download module (block 1626). Both branches of the foregoing segment determination/selection operations are iterated until there are no additional segments identified in the manifest file to download (block 1630), whereupon the process exits (block 1632).

It should be noted in a still further implementation, an embodiment of the present disclosure may include additional features relating to curtailing a client's ability to choose bitrates by stripping the manifest to include only a single bitrate, preferably based on modeling of the client's buffer conditions, utilization, etc. If the manifest is stripped of all but one single bitrate and the server calculates the delivery bandwidth to the client to determine the proper segment data to deliver or pull, it would prevent the client from making "greedy" ABR selection choices. Additional details regarding manipulating bitrates of a manifest file responsive to a client device's video buffer characteristics simulated at a stream delivery server may be found in following commonly owned U.S. patent application: (i) "SYSTEM AND METHOD FOR MANAGING ABR BITRATE DELIVERY REPONSIVE TO VIDEO BUFFER CHARACTERISTICS OF A CLIENT" (Ericsson Ref. No.: P44764-US1), application Ser. No. 14/737,550, filed Jun. 12, 2015, in the name(s) of Chris Phillips et al., published as U.S. Patent Application Publ. No. 2016/0366202 A1; incorporated by reference herein.

Figure 17:
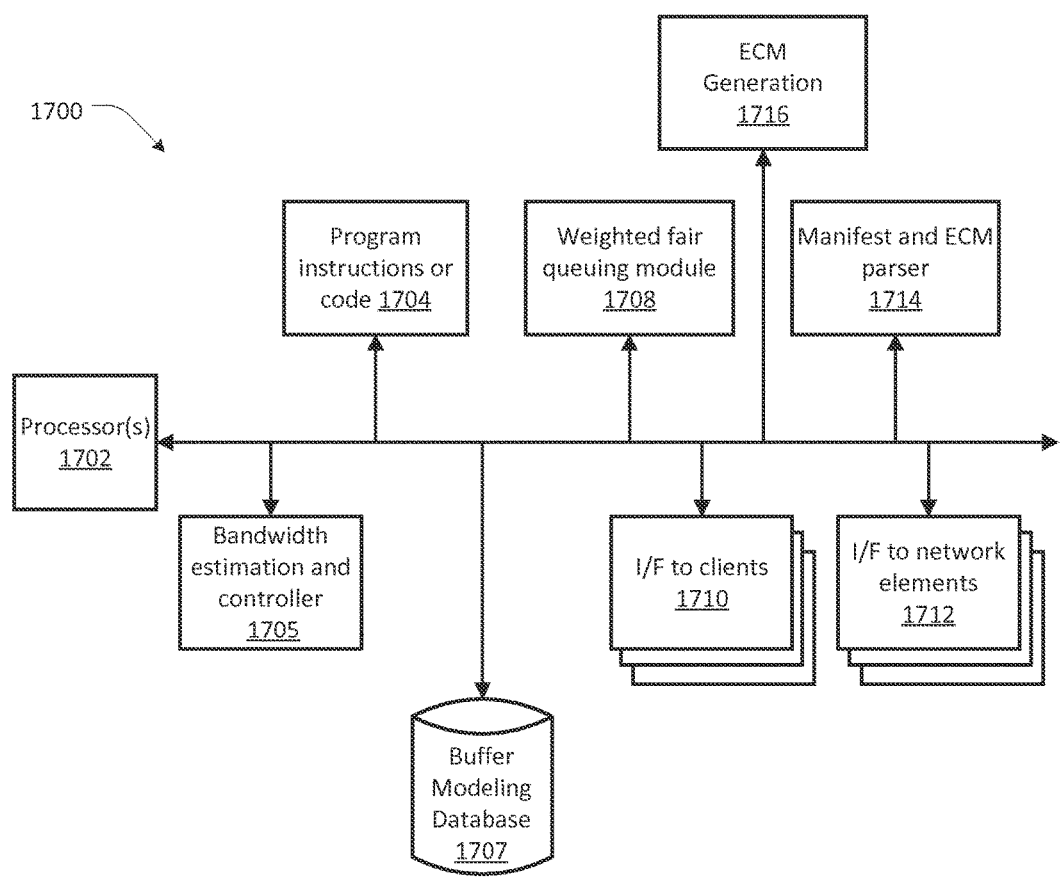
FIG. 17 depicts a block diagram of an apparatus that may be configured as an example network node, subsystem or element for practicing an embodiment of the present invention.

FIG. 17 depicts a block diagram of an apparatus that may be configured as an example network node or element for practicing an embodiment of the present invention. It should be appreciated that apparatus 1700 may be variously configured to operate as an ABR stream delivery server, bandwidth-controlled delivery server, a virtualized segmentation system, or any combination thereof disposed in association with an edge network or as an encoder/segmenter/packager subsystem at suitable upstream network location(s) for implementing one or more embodiments described hereinabove. One or more processors 1702 may be operatively coupled to various modules that may be implemented in persistent memory for executing suitable program instructions or code portions with respect to effectuating ECM generation, manifest/ECM parsing, etc. as exemplified by modules 1714, 1716. A buffer modeling database 1707 may be provided for storing in-memory representations of a plurality of client devices' video buffers, which may be structured as database records corresponding to individual client devices and their respective streaming sessions. Additional modules such as WFQ module 1708, bandwidth estimation and controller module 1705, and the like may also be provided to facilitate segment delivery and/or bandwidth management processes under suitable program instructions or code 1704 executable by the processors 1702. Where a network edge subsystem includes dynamic virtualized segmentation, such functionality may be also embodied in suitable program instructions or code 1704. Appropriate client-bound interfaces (I/F) 1710 may be provided for facilitating wireline or wireless connectivity to a plurality of client devices. Likewise, appropriate interfaces 1712 to various network elements and/or databases may be provided depending on a particular network node implementation. For example, in a CDN implementation, such interfaces may include interfaces to one or more regional distribution nodes, or other peer edge delivery nodes, or policy management nodes, or HTTP content servers, etc., as well as interfaces configured to effectuate a delivery pipe to a subscriber premises node. In a mobile communications network implementation, the interfaces may include interfaces to downstream backhaul network elements, e.g., to base stations, or upstream backhaul network elements, e.g., HTTP content servers, as well as other network elements of a mobile network infrastructure. Accordingly, depending on the context, interfaces selected from interfaces 1710 or interfaces 1712 may sometimes be referred to as a first interface, a second interface, and the like.

In the above-description of various embodiments of the present disclosure, it is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this specification and the relevant art and may not be interpreted in an idealized or overly formal sense expressly so defined herein.

At least some example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. Such computer program instructions may be provided to a processor circuit of a general purpose computer circuit, special purpose computer circuit, and/or other programmable data processing circuit to produce a machine, so that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s). Additionally, the computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

As alluded to previously, tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/Blu-ray). The computer program instructions may also be loaded onto or otherwise downloaded to a computer and/or other programmable data processing apparatus to cause a series of operational steps to be performed on the computer and/or other programmable apparatus to produce a computer-implemented process. Accordingly, embodiments of the present invention may be embodied in hardware and/or in software (including firmware, resident software, micro-code, etc.) that runs on a processor or controller, which may collectively be referred to as "circuitry," "a module" or variants thereof. Further, an example processing unit may include, by way of illustration, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. As can be appreciated, an example processor unit may employ distributed processing in certain embodiments.

Further, in at least some additional or alternative implementations, the functions/acts described in the blocks may occur out of the order shown in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Furthermore, although some of the diagrams include arrows on communication paths to show a primary direction of communication, it is to be understood that communication may occur in the opposite direction relative to the depicted arrows. Finally, other blocks may be added/inserted between the blocks that are illustrated.

It should therefore be clearly understood that the order or sequence of the acts, steps, functions, components or blocks illustrated in any of the flowcharts depicted in the drawing Figures of the present disclosure may be modified, altered, replaced, customized or otherwise rearranged within a particular flowchart, including deletion or omission of a particular act, step, function, component or block. Moreover, the acts, steps, functions, components or blocks illustrated in a particular flowchart may be inter-mixed or otherwise inter-arranged or rearranged with the acts, steps, functions, components or blocks illustrated in another flowchart in order to effectuate additional variations, modifications and configurations with respect to one or more processes for purposes of practicing the teachings of the present patent disclosure.

Although various embodiments have been shown and described in detail, the claims are not limited to any particular embodiment or example. None of the above Detailed Description should be read as implying that any particular component, element, step, act, or function is essential such that it must be included in the scope of the claims. Reference to an element in the singular is not intended to mean "one and only one" unless explicitly so stated, but rather "one or more." All structural and functional equivalents to the elements of the above-described embodiments that are known to those of ordinary skill in the art are expressly incorporated herein by reference and are intended to be encompassed by the present claims. Accordingly, those skilled in the art will recognize that the exemplary embodiments described herein can be practiced with various modifications and alterations within the spirit and scope of the claims appended below.

What is claimed is:

1. A method operating at a stream delivery server for managing delivery of segmented media content in an adaptive bitrate (ABR) network, the method comprising:

receiving, by the stream delivery server, encoding complexity metric (ECM) values associated with one or more ABR representations of a media asset wherein the one or more ABR representations each comprise a stream of segmented content of the media asset encoded at a corresponding bitrate;

responsive to a request from an ABR client device for downloading a segment of the media asset having a particular bitrate representation, determining, by the stream delivery server, a set of video encoding bitrates identified within a manifest provided to the ABR client device for facilitating streaming of the media asset, wherein the set of video encoding bitrates consist of bitrates of segments belonging to a same video resolution class that the ABR client device has settled on for streaming the media asset;

performing a segment selection process by the stream delivery server based on evaluating received ECM values across segment bitrates of the same video resolution class against a complexity threshold value;

selecting, by the stream delivery server, a lowest-bitrate-encoded segment having an ECM value equal to or exceeding the complexity threshold value, wherein the segment selection process comprises examining all bitrate segments having ECM values exceeding or equal to the complexity threshold value over a same video timeframe and determining the lowest-bitrate-encoded segment from the bitrate segments satisfying the complexity threshold value evaluation; and delivering the selected segment to the ABR client device instead of the requested segment if the selected segment's bitrate is lower than the particular bitrate of the requested segment and otherwise delivering the requested segment having the particular bitrate to the ABR client device.

2. The method as recited in claim 1, wherein the segment selection process is further based on comparing the bitrates of segments belonging to the same video resolution class with the bitrate of the segment being requested.

3. The method as recited in claim 1, further comprising determining whether there is any segment in the same video timeframe and the video resolution class as the requested segment that has an ECM value higher than or equal to the complexity threshold value.

4. The method as recited in claim 3, if there is no segment in the same video timeframe and the video resolution class as the requested segment having an ECM value higher than or equal to the complexity threshold value, delivering the requested segment to the ABR client device.

5. The method as recited in claim 1, wherein the ECM values are received as one of a complexity catalog file that is separate from the manifest associated with streaming of the media asset and a complexity catalog file that is included within the manifest.

6. The method as recited in claim 1, wherein the ECM values comprise MOS data computed over applicable timing reference points of each ABR representation of the media asset and further wherein the timing reference points comprise at least one of stream access points (SAP), random access points (RAP), presentation timestamps (PTS), decoding timestamps (DTS), program clock references (PCR) and system clock references (SCR) associated with each ABR representation.

7. The method as recited in claim 1, wherein the media asset is streamed to the ABR client device using a streaming protocol comprising at least one of HTTP Live Streaming (HLS) protocol, Smooth Streaming over HTTP protocol, Dynamic Flash Streaming protocol, and MPEG Dynamic Adaptive Streaming over HTTP (MPEG DASH) protocol.

8. The method as recited in claim 1, wherein the media asset requested by the ABR client device is virtually segmented by a dynamic virtual segmenter coupled to the stream delivery server and further wherein the ECM values associated with each ABR representation are mapped to corresponding ECM data derived based on virtualized representation of the media asset, the corresponding derived ECM data being utilized in encoding complexity threshold comparison operations instead of the received ECM values.

9. The method as recited in claim 1, wherein the stream delivery server is configured as at least a part of an edge network node associated with one of a Digital Subscriber Line (DSL) network architecture, a Data Over Cable Service Interface Specification (DOCSIS)-compliant Cable Modem Termination System (CMTS) network architecture, a mobile telecommunications network architecture, and a content delivery network (CDN) architecture.

10. The method as recited in claim 1, wherein the media asset is one of a live media content and a stored Video-On-Demand (VOD) content.

11. An apparatus configured to operate as a stream delivery server for managing delivery of segmented media content in an adaptive bitrate (ABR) network, the apparatus comprising:

at least one processor; and one or more persistent memory modules coupled to the at least one processor, wherein the persistent memory modules include program instructions which, when executed by the at least one processor, are configured to perform:

parsing received encoding complexity metric (ECM) values associated with one or more ABR representations of a media asset wherein the one or more ABR representations each comprise a stream of segmented content of the media asset encoded at a corresponding bitrate;

responsive to a request from an ABR client device for downloading a segment of the media asset having a particular bitrate representation, determining a set of video encoding bitrates identified within a manifest provided to the ABR client device for facilitating streaming of the media asset, wherein the set of video encoding bitrates consist of bitrates of segments belonging to a same video resolution class that the ABR client device has settled on for streaming the media asset;

performing a segment selection process based on evaluating received ECM values across segment bitrates of the same video resolution class against a complexity threshold value;

selecting a lowest-bitrate-encoded segment having an ECM value equal to or exceeding the complexity threshold value, wherein the segment selection process comprises examining all bitrate segments having ECM values exceeding or equal to the complexity threshold value over a same video timeframe and determining the lowest-bitrate-encoded segment from the bitrate segments satisfying the complexity threshold value evaluation; and delivering the selected segment to the ABR client device instead of the requested segment if the selected segment's bitrate is lower than the particular bitrate of the requested segment and otherwise delivering the requested segment having the particular bitrate to the ABR client device.

12. The apparatus as recited in claim 11, wherein the ECM values are received as a complexity catalog file included within the manifest associated with streaming of the media asset.

13. The apparatus as recited in claim 11, wherein the ECM values are received as a complexity catalog file that is separate from the manifest associated with streaming of the media asset.

14. The apparatus as recited in claim 11, wherein the ECM values comprise MOS data computed over applicable timing reference points of each ABR representation of the media asset and further wherein the timing reference points comprise at least one of stream access points (SAP), random access points (RAP), presentation timestamps (PTS), decoding timestamps (DTS), program clock references (PCR) and system clock references (SCR) associated with each ABR representation.

15. The apparatus as recited in claim 11, wherein the media asset is streamed to the ABR client device using a streaming protocol comprising at least one of HTTP Live Streaming (HLS) protocol, Smooth Streaming over HTTP protocol, Dynamic Flash Streaming protocol, and MPEG Dynamic Adaptive Streaming over HTTP (MPEG DASH) protocol.

16. The apparatus as recited in claim 11, further comprising a dynamic virtual segmenter coupled to the stream delivery server and operative to virtually segment the media content into a plurality of data structures stored in a random access memory unit, wherein the plurality of data structures include pointers corresponding to time codes and references to one or more access points in the media content, and further wherein the apparatus comprises a complexity mapper for mapping the ECM values associated with each ABR representation to corresponding ECM data derived based on virtualized representation of the media asset, the corresponding derived ECM data being utilized in encoding complexity threshold comparison operations instead of the received ECM values.

17. The apparatus as recited in claim 11, wherein the stream delivery server is configured as at least a part of an edge network node associated with one of a Digital Subscriber Line (DSL) network architecture, a Data Over Cable Service Interface Specification (DOCSIS)-compliant Cable Modem Termination System (CMTS) network architecture, a mobile telecommunications network architecture, and a content delivery network (CDN) architecture.

18. The apparatus as recited in claim 11, wherein the media asset is one of a live media content and a stored Video-On-Demand (VOD) content.

19. A non-transitory machine-readable storage medium having program instructions thereon, which are configured to perform following acts when executed by one or more processors of a stream delivery server for managing delivery of segmented media content in an adaptive bitrate (ABR) network:
  receive encoding complexity metric (ECM) values associated with one or more ABR representations of a media asset wherein the one or more ABR representations each comprise a stream of segmented content of the media asset encoded at a corresponding bitrate;
  responsive to a request from an ABR client device for downloading a segment of the media asset having a particular bitrate representation, determine a set of video encoding bitrates identified within a manifest provided to the ABR client device for facilitating streaming of the media asset, wherein the set of video encoding bitrates consist of bitrates of segments belonging to a same video resolution class that the ABR client device has settled on for streaming the media asset;
  effectuate a segment selection process based on evaluating received ECM values across segment bitrates of the same video resolution class against a complexity threshold value;
  selecting a lowest-bitrate-encoded segment having an ECM value equal to or exceeding the complexity threshold value, wherein the segment selection process comprises examining all bitrate segments having ECM values exceeding or equal to the complexity threshold value over a same video timeframe and determining the lowest-bitrate-encoded segment from the bitrate segments satisfying the complexity threshold value evaluation; and
  deliver the selected segment to the ABR client device instead of the requested segment if the selected segment's bitrate is lower than the particular bitrate of the requested segment and otherwise delivering the requested segment having the particular bitrate to the ABR client device.

20. The non-transitory machine-readable storage medium as recited in claim 19, wherein the ECM values are received as a complexity catalog file included within the manifest associated with streaming of the media asset.

21. The non-transitory machine-readable storage medium as recited in claim 19, wherein the ECM values are received as a complexity catalog file that is separate from the manifest associated with streaming of the media asset.

22. The non-transitory machine-readable storage medium as recited in claim 19, wherein the ECM values comprise MOS data computed over applicable timing reference points of each ABR representation of the media asset and further wherein the timing reference points comprise at least one of stream access points (SAP), random access points (RAP), presentation timestamps (PTS), decoding timestamps (DTS), program clock references (PCR) and system clock references (SCR) associated with each ABR representation.

23. The non-transitory machine-readable storage medium as recited in claim 19, wherein the media asset is delivered to the ABR client device using a streaming protocol comprising at least one of HTTP Live Streaming (HLS) protocol, Smooth Streaming over HTTP protocol, Dynamic Flash Streaming protocol, and MPEG Dynamic Adaptive Streaming over HTTP (MPEG DASH) protocol.

24. The non-transitory machine-readable storage medium as recited in claim 19, further comprising program instructions configured to:
  virtually segment the media content into a plurality of data structures stored in a random access memory unit, wherein the plurality of data structures include pointers corresponding to time codes and references to one or more access points in the media content; and
  map the ECM values associated with each ABR representation to corresponding ECM data derived based on virtualized representation of the media asset, wherein the corresponding derived ECM data is utilized in complexity threshold comparison operations instead of the received ECM values.

25. The non-transitory machine-readable storage medium as recited in claim 19, wherein the stream delivery server is configured as at least a part of an edge network node associated with one of a Digital Subscriber Line (DSL) network architecture, a Data Over Cable Service Interface Specification (DOCSIS)-compliant Cable Modem Termination System (CMTS) network architecture, a mobile telecommunications network architecture, and a content delivery network (CDN) architecture.

26. The non-transitory machine-readable storage medium as recited in claim 19, wherein the media asset is one of a live media content and a stored Video-On-Demand (VOD) content.

* * * * *